United States Patent
Brooks

(10) Patent No.: US 8,849,122 B2
(45) Date of Patent: Sep. 30, 2014

(54) APPARATUS AND METHODS FOR DYNAMIC DELIVERY OF OPTICAL AND NON-OPTICAL CONTENT IN A NETWORK

(75) Inventor: Paul D. Brooks, Weddington, NC (US)

(73) Assignee: Time Warner Cable Enterprises, LLC, New York, NY (US)

( * ) Notice: Subject to any disclaimer, the term of this patent is extended or adjusted under 35 U.S.C. 154(b) by 117 days.

(21) Appl. No.: 13/451,396

(22) Filed: Apr. 19, 2012

(65) Prior Publication Data
US 2013/0279914 A1    Oct. 24, 2013

(51) Int. Cl.
H04B 10/00    (2013.01)
H04J 14/00    (2006.01)

(52) U.S. Cl.
USPC ............................. 398/115; 398/71; 398/72

(58) Field of Classification Search
USPC ............................. 398/58, 66–68, 70–72, 115
See application file for complete search history.

(56) References Cited

U.S. PATENT DOCUMENTS

| | | | |
|---|---|---|---|
| 5,765,097 A * | 6/1998 | Dail ............................... | 725/125 |
| 5,864,672 A * | 1/1999 | Bodeep et al. ................. | 725/126 |
| 6,381,248 B1 * | 4/2002 | Lu .................................. | 370/437 |
| 6,577,414 B1 | 6/2003 | Feldman et al. | |
| 6,765,931 B1 | 7/2004 | Rabenko et al. | |
| 6,912,209 B1 | 6/2005 | Thi et al. | |
| 6,985,492 B1 | 1/2006 | Thi et al. | |
| 7,023,868 B2 | 4/2006 | Rabenko et al. | |
| 7,184,664 B2 | 2/2007 | Farmer et al. | |
| 7,366,415 B2 | 4/2008 | Lee et al. | |
| 7,529,485 B2 | 5/2009 | Farmer et al. | |
| 7,596,801 B2 | 9/2009 | Wall et al. | |
| 7,657,919 B2 | 2/2010 | Alsobrook et al. | |
| 7,701,954 B2 | 4/2010 | Rabenko et al. | |
| 7,933,295 B2 | 4/2011 | Thi et al. | |
| 8,180,222 B2 * | 5/2012 | Sucharczuk et al. ............ | 398/70 |
| 8,254,404 B2 | 8/2012 | Rabenko et al. | |
| 2007/0250900 A1 | 10/2007 | Marcuvitz | |
| 2008/0120667 A1 | 5/2008 | Zaltsman | |
| 2011/0002245 A1 * | 1/2011 | Wall et al. ...................... | 370/297 |
| 2011/0103374 A1 | 5/2011 | Lajoie et al. | |
| 2013/0125194 A1 * | 5/2013 | Finkelstein et al. .......... | 725/129 |

* cited by examiner

Primary Examiner — Dalzid Singh
(74) Attorney, Agent, or Firm — Gazdzinski & Associates, PC

(57) ABSTRACT

Apparatus and methods for providing content to devices in a content distribution network. In one embodiment, a hybrid fiber/coax network provides optical signals to an amplification and combination node, the signals which are converted to radio frequency (RF) signals and transmitted to a series of cascading amplification and combination apparatus. The converted signals are combined with legacy RF signals at the combination apparatus, and distributed further downstream to serviced premises as well as other portions of the network cascade. Time division techniques are used to mitigate interference between the various amplification and combination nodes within the cascade. The programmable time division devices allow for rapid spectrum reallocation, and for insertion of different content at each different node of the network.

20 Claims, 19 Drawing Sheets

NOTES:

1) LEGACY 5-42 MHz RF UPSTREAM SPECTRUM DOES NOT CHANGE.

2) STARTING POINT: PASSIVE BW 54-1002 MHz  TYPICAL EXISTING CHANNEL CARRIAGE 78 ANALOG, 37 DIGITAL, 4 DIGITAL IN ROLL-OFF TO 774 MHz

3) FIBER MUST BE EXTENDED TO EACH AMPLIFIER (NODE PLUS ZERO)

4) THE FOLLOWING TABLE IS BASED ON THE ASSUMPTION OF 256QAM EQUIVALENT (6.5 bits/CYCLE, 35dB C/N)

| ANALOG | SDV VOD DIGITAL | MAS DAVIC BONDED DOCSIS | TDDHSO W/ 12 MHz GUARD BAND | SPLIT FREQUENCY |
|---|---|---|---|---|
| 78 | 35 | 6 | 1.4 Gbit/s | 774 MHz (750 PLUS 44 ch ROLL-OFF) |
| 63 | 35 | 6 | 2.0 Gbit/s | 684 MHz |
| 51 | 47 | 6 | 2.0 Gbit/s | 684 MHz |
| 37 | 47 | 6 | 2.5 Gbit/s | 600 MHz |
| 26 | 47 | 6 | 3.0 Gbit/s | 534 MHz |
| 0 | 47 | 6 | 4.0 Gbit/s | 378 MHz |
| 26 | 21 | 6 | 4.0 Gbit/s | 378 MHz |
| 0 | 21 | 6 | 5.0 Gbit/s | 222 MHz |
| 26 | 0 | 0 | 5.0 Gbit/s | 216 MHz |
| 0 | 0 | 0 | 6.1 Gbit/s | 54 MHz |

FIG. 3E

——————— INTENDED SIGNAL
- - - - - - - INTERFERING SIGNAL

———— INTENDED SIGNAL
- - - - - - - INTERFERING SIGNAL

——— INTENDED SIGNAL
– – – – – INTERFERING SIGNAL

——————— INTENDED SIGNAL
— — — — — — INTERFERING SIGNAL

APPARATUS AND METHODS FOR DYNAMIC DELIVERY OF OPTICAL AND NON-OPTICAL CONTENT IN A NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content delivery. In one exemplary aspect, the invention relates to the delivery of optical and non-optical content via a delivery network which is dynamically adjustable to accommodate varying proportions of each.

2. Description of Related Technology

Content distribution networks (such as e.g., Cable Television (CATV) systems) provide content from various content sources at a network headend to a plurality of subscriber devices. In the exemplary context of CATV, delivery to the subscriber devices was accomplished by transmitting radio frequency (RF) signals over coaxial cables.

Such prior art RF networks require the use of separate frequency bands for delivery of content, and for various types of communications between network entities. In practice, this distinct frequency band architecture is implemented largely through the use of frequency separating filter apparatus (e.g., so-called "diplexers", which in effect multiplex two or more signals into disjoint frequency bands through use of, inter alia, low- and high-pass filters). However, such diplexer apparatus are generally (i) fixed in terms of frequency characteristics; (ii) consume a significant amount of otherwise available bandwidth (due to e.g., the required precision associated with the filter so as to avoid the undesirable phenomenon of "group delay", the rolloff characteristics of the filters, etc.).

As an extension of the foregoing, many modern systems now utilize digital light pulses transmitted over optical fibers to more efficiently provide content in a first portion of the network towards the core (e.g., a DWDM or other optical "ring"), and then utilize existing coaxial cabling for providing content to the subscriber's individual homes (due to the large amount of extant coaxial cable in the premises). This is referred to as a "hybrid fiber/coaxial cable network" or HFC network.

Specifically, a hybrid fiber/coax network typically includes a head end that broadcasts programming over the network to subscribers in a downstream direction. A first portion of the network utilizes optical links to connect the headend with a number of geographically dispersed distribution nodes (referred to as "optical distribution nodes", "ODNs", or simply "nodes"). At the ODNs, signals from the headend that carry the programming are converted from optical signals to electrical signals. A second portion of the network utilizes coaxial links to connect the nodes with subscriber equipment, as well as to other nodes.

Optical fiber permits transmission over longer distances and at higher bandwidths (data rates) than other forms of carriage (such as coaxial cable). However, the incremental installation costs of new optical fiber versus use of existing fiber and coaxial cabling have thus far inhibited utilization of optical fibers any deeper into the network than from network hubs to the nodes which service multiple hundreds of homes in a neighborhood or service area. Installation of fiber to each existing premises is largely cost prohibitive.

As noted above and illustrated in FIG. 1, existing networks provide content signals to a plurality of subscribers via fiber to a first node. The first node converts optical signals to and from RF electrical signals, and amplifies these signals in order to distribute-content to and collect data from a plurality of homes serviced by the node. A plurality of amplifier devices are provided to amplify RF signals so that it may be pushed further out into the network edge (i.e., on to additional homes serviced by the node). This cascading approach has the cost benefit of requiring optical fiber only to the node. However, this system suffers many of the same problems of the traditional all-coaxial cable network, in that the delivery of the content as RF signals between repeater amplifiers is limiting.

Under another prior art scheme (commonly referred to as "node plus zero"), optical fiber is run out to each node of the network, and then is delivered passively to each downstream customer. The term "passive" in this context refers to the situation where no power consuming devices are present in a link other that those at the endpoints. Node plus zero in this context refers to architecture between an optical-to-electrical or electrical-to-optical conversion device (node) and a coaxially-fed endpoint. See for example the Aurora Networks' "Fiber Deep™" architecture, which uses a traditional HFC node but does not use repeater amplifiers. This "node plus zero" approach ostensibly provides the benefits of shortened runs of optical fiber, and the simplicity of passive delivery. However, in practice, this approach has a number of salient drawbacks, including: (i) the requirement for a separate laser and receiver for each node (and in the network head end), which can be quite costly, and (ii) the need to adjust, inspect, and possibly align the laser frequently, thereby incurring a high degree of technician labor and maintenance resources, and reducing the robustness of the system.

Other prior art approaches seek to add additional bands of service (e.g., above existing or legacy service bands) through use of filtration. Specifically, in such prior art approaches, a series of diplex filters are used at various locations throughout the network so as selectively create new bands in tandem with extant or legacy bands. In this case, the newly added signals (bands) are introduced at one of the termination points, and effectively sent through the network distribution cascade to the opposite termination point. This necessitates (aside from points where the signal power is split are passive and bidirectional in nature and as full-band connections, do not employ or require filters) use of filtration and/or other design considerations at effectively every repeater amplifier within the network cascade, which is highly cost intensive. Moreover, in order to ensure adequate performance (including the undesirable phenomenon of group delay), very precise and high performance diplex filters are required, thereby increasing cost.

For the reasons stated above, and for other reasons stated below which will become apparent to those skilled in the art upon reading and understanding the present specification, there is a need in the art for an improved cascading network architecture. Ideally the improved network would build on top of and utilize existing infrastructure to the maximum extent practical to support a slow and manageable migration to optical technologies (i.e., providing optical fiber to all amplifiers within the network) over time, not require large capital investments in restructuring the existing network, while also maintaining RF connectivity to the homes uninterrupted. Additionally, the improved network would utilize more recent advances in signal conditioning and processing to provide more efficient and flexible connectivity, and the incrementally added infrastructure would further be comparatively maintenance free (so as to avoid, e.g., the aforementioned frequent alignment or other maintenance dictated by prior art multi-band systems).

SUMMARY OF THE INVENTION

The present invention provides, inter alia, apparatus and methods for content distribution.

In a first aspect of the invention, a system for providing content to a plurality of devices is disclosed. In one embodiment, the plurality of devices are in a service group of a content delivery network, and the system includes: a network entity comprising at least one apparatus for transmitting first optical signals; a plurality of amplification and combination apparatus disposed substantially in series to one another and configured to convert optical signals to first radio frequency (RF) signals, a first one of the series of amplification and combination apparatus also being in communication with a service node, the service node configured to transmit second RF signals thereto; and a plurality of client devices, each of the plurality of client devices in communication with at least one of the plurality of amplification and combination apparatus.

In one variant, the amplification and combination apparatus in the series are each configured to combine the first RF signals with the second RF signals so as to generate a combined RF signal, and transmit the combined signal to at least a portion of the client devices.

In a second aspect of the invention, an amplifier apparatus is disclosed. In one embodiment, the apparatus is configured for providing content to a plurality of user devices in a network, the network comprising an amplifier cascade, and the amplifier apparatus includes: a first interface for receiving first radio frequency (RF) signals from the network; a second interface for receiving optical signals from the network; a first apparatus for amplifying the received first RF signals; a second apparatus for converting the optical signals to second RF signals; a combiner apparatus for combining the first and second RF signals into a combined signal; and a third interface for transmitting the combined signals to the plurality of client devices in the network in communication with the amplifier device, and to a downstream portion of the amplifier cascade.

In a third aspect of the invention, a cascaded hybrid optical fiber and radio frequency (RF) content distribution architecture is disclosed. In one embodiment, the architecture includes: at least one first node for delivering RF signals to a first amplification and combination node; at least one second node for delivering optical signals to the first amplification and combination node; a first plurality of user devices in RF communication with the first amplification and combination node; a second amplification and combination node in RF communication with, and downstream of, the first amplification and combination node; and a second plurality of user devices in communication with the second amplification and combination node.

In a fourth aspect of the invention, a method for providing heterogeneous content to a plurality of devices in a network is disclosed. In one embodiment, the method includes: receiving first signals rendered in a first format; receiving second signals rendered in a second format; converting the second signals to the first format; combining the first signals and converted second signals into a common signal; and transmitting the combined signals to the plurality of client devices in the network.

In a fifth aspect of the invention, a method of selectively inserting content into a content distribution network is disclosed. In one embodiment, the method includes: providing existing radio frequency (RF) domain content to a node of the network; providing content for insertion to the node in the optical domain; converting the optical domain content to RF domain content; combining the existing RF domain content with the converted RF domain content comprising first and second frequency bands, respectively; and transmitting the combined RF domain content downstream in the network.

In a sixth aspect of the invention, a method of delivering content from multiple origination points over a content distribution network is disclosed. In one embodiment, the method includes: transmitting first content from a first amplification node of the network onto a first portion of the network; transmitting second content from a second amplification node of the network onto the network; and implementing a multiple access scheme with respect to at least the first and second amplification nodes so that interference between the transmitted first and second content to not substantially interfere with one another. In one variant, the first portion includes the second amplification node.

In a seventh aspect of the invention, premises amplification apparatus is disclosed. In one embodiment, the apparatus includes: a signal splitter for spitting an incoming radio frequency signal into first and second signals; filtration apparatus in signal communication with the splitter and configured to filter at least one frequency range of the first signals; time division duplex apparatus in signal communication with the splitter and configured to apply a time division duplex scheme to the second signals; and coupler apparatus in signal communication with the time division duplex apparatus and the filtration apparatus, In one variant, the apparatus maintains MoCA connectivity by way of time division duplex apparatus and the signal communication between the time division duplex apparatus and the coupler apparatus.

In an eighth aspect of the invention, a method of operating a hybrid optical and radio frequency network is disclosed. In one embodiment, the method includes: transmitting a plurality of packets downstream within the network according to a time division duplex scheme, the packets having substantially real-time content associated therewith; and utilizing the packets to provide the substantially real time content to a plurality of user devices without having to duplicate the packets for different ones of the plurality of user devices as in a multicast.

These and other aspects of the invention shall become apparent when considered in light of the disclosure provided herein.

BRIEF DESCRIPTION OF THE DRAWINGS

FIG. 3e is a functional block diagram illustrating examples of how legacy bandwidth can be progressively harvested over time using the capability of the present invention to change or modify frequency band(s).

Figure 1:
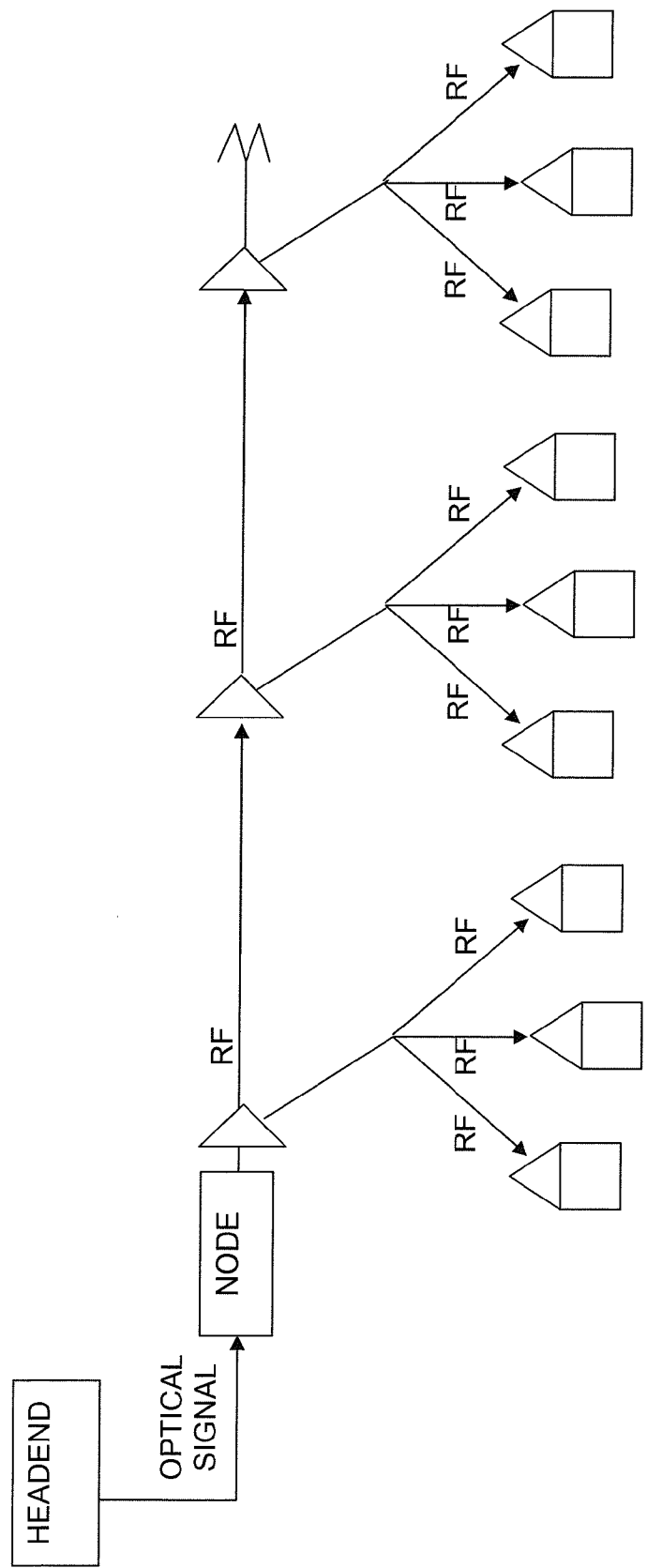
FIG. 1 is a functional block diagram illustrating a prior art network for providing content to a plurality of service nodes using a hybrid fiber/coax architecture.

All Figures© Copyright 2011-2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421 M) families.

As used herein, the term "computer program" or "software" is meant to include any sequence or human or machine cognizable steps which perforin a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO or multiple systems operator) that distributes programming to MSO clientele using client devices. Such programming may include literally any information source/receiver including, inter cilia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes, and/or to a physical equipment chassis or housing containing multiple instances of channels utilizing this modulation.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers), or the resources shared by them in the form of for example entire cable RF signal, only the RF channels used to receive the service or otherwise treated as a single logical unit by the network for resource assignment.

As used herein, the terms "splitting" and "split" refer generally and without limitation to the process of dividing or reducing a signal or service group into two or more constituent components, and in no way is limited to an even division into two equal components.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present invention discloses methods and apparatus for providing content to a plurality of devices serviced by a network node. In one exemplary embodiment, a hybrid fiber/conductor network provides first optical signals from a headend entity to each of a plurality of existing network amplifier nodes, the nodes having been modified to include optical conversion and RF signal combining capability. The optical signals are converted at the node to and from radio frequency (RF) electrical signals, and then combined with other existing RF electrical domain signals (e.g., legacy cable-band signals already delivered to that node), and transmitted to and from a plurality of client devices and one or more downstream amplifier/combiner nodes in a "cascade".

In one variant, the amplifier device is configured to utilize time division duplexing (TDD) or time division multiple access (TDMA) techniques to avoid interference between the converted optical signal and other signals in the same frequency band.

In another variant, the optical signal received directly at the amplifier is the same content received by all amplifiers in the cascade. Alternatively, the content may be heterogeneous; i.e., include local content, targeted content, etc.

The foregoing exemplary embodiments provide a number of different benefits and advantages, including inter alia: (i) requiring minimal component additions or modifications to the existing network to implement the enhanced functionality; (ii) obviation of multitudes of diplex or other filter-based technologies (including e.g., filter based TDD transceivers/combiners); (iii) reduced maintenance burden; and (iv) the ability to flexibly migrate services and/or IP data traffic to optical domain delivery over time while still delivering legacy services uninterrupted.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber/coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Exemplary Network Architecture—

Figure 2:
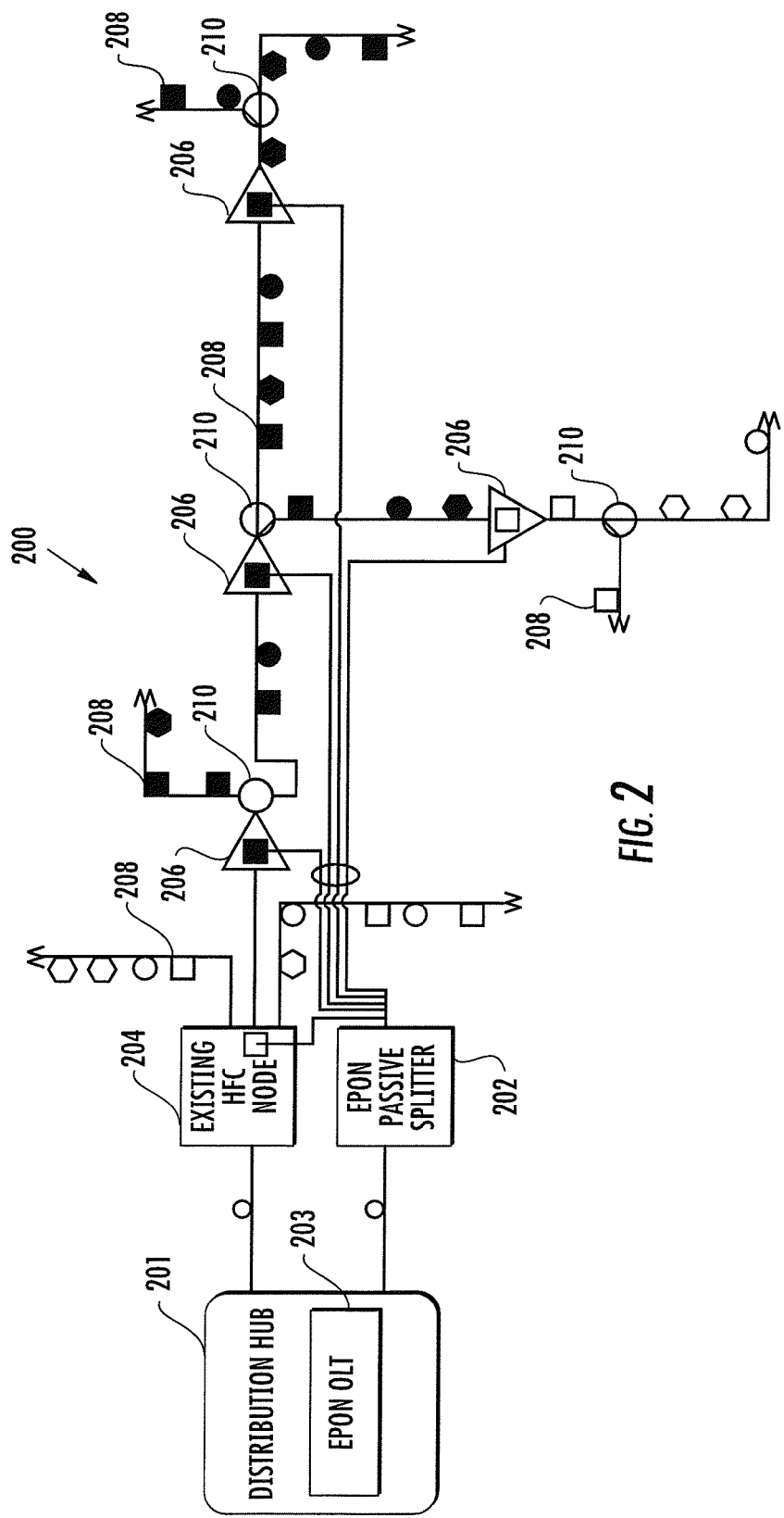
FIG. 2 is a functional block diagram illustrating an exemplary embodiment of a hybrid fiber/coax network for providing content to a plurality of service nodes according to the present invention.

Referring now to FIG. 2, an exemplary embodiment of a network 200 for providing content to a plurality of client devices 208 in a service area according to the present invention is illustrated. As noted, while described herein in the context of a hybridized (i.e., fiber and wireline conductor such as coaxial cable) extant network topology, the present invention is in no way so limited.

An HFC network includes one or more data and application origination points, one or more content sources, one or more application distribution servers, and one or more VOD servers at a network headend. The distribution server(s), VOD servers, and content sources to a plurality of CPE connected via the bearer (e.g., HFC) network. The headend may also connect through a gateway or other such interface to unmanaged external internetwork such as the Internet.

As shown, the exemplary embodiment of the inventive network 200 further includes a network headend distribution hub 201 having an Ethernet passive optical network optical line terminal (EPON OLT) 203. The EPON OLT 203 serves as the service provider endpoint of the EPON. The EPON OLT 203 performs a conversion between the electrical signals used by the MSO's equipment and the fiber optic signals used by the passive optical network, and coordinates the multiplexing between the conversion devices on the other end of the EPON network (i.e., the optical network terminals (ONT) and/or optical network units (ONU)).

The optical signal is received from the EPON OLT 203 at an HFC node 204 via the passive splitter 202. The HFC node 204, as discussed above, is extant infrastructure in this case, and is primarily utilized for providing content to a plurality of homes and/or devices within a service area. As shown, the HFC node 204 delivers legacy RF signals received from the distribution hub 201 to the plurality of consumer devices 208 in the service area.

However, the HFC node 204 is also, in the illustrated embodiment, configured to receive optical signals from an EPON passive splitter 202. In this instance the HFC node 204 comprises an ONU (and associated converter, discussed below with respect to FIG. 3) to transform the optical signals into radio frequency (RF) signals, and ultimately provide these to the plurality of homes/devices 208 serviced thereby.

As shown, each HFC node is responsible for servicing a plurality of homes and/or devices. As indicated in the discussion above and illustrated in FIG. 2, one or more amplification and signal combination apparatus 206 are disposed between the node 204 and the homes/devices 208. The apparatus 206 amplify the RF signal which is transmitted deeper into the network (i.e., toward client devices 208 disposed at the edge, further from the node 204). Additionally, one or more splitters 210 are used to split the amplified signals for broader and more diverse penetration of the signal within the network.

In one salient aspect of the invention, the optical splitter 202 is further utilized to provide the optical signal (which was originally provided to the node 204) to one or more of the amplification and signal combination apparatus 206. To accomplish this, new optical fiber is installed from the splitter 202 (which may be located in varying locations, such as at a point geographically proximate to the customers, typically co-located with the existing HFC node as shown in FIG. 2. In this manner, the (often degraded) RF signal which is transmitted as one progresses deeper out from the core into the network is replaced by the optical version of that signal. In this manner, the signal quality advantageously remains high throughout its transmission into the distribution network. Additionally, transmission of an optical signal (as opposed to an RF signal) enables the network to provide greater amount of data to the amplifier. Moreover, the exemplary apparatus described herein lends itself to future service group segmentation for legacy signals as well, once the fiber has been installed.

The network 201 illustrated in FIG. 2 makes use of an improved amplification and combination apparatus (as discussed below with respect to FIG. 3) and fiber to one or more amplifiers. However, the extant diplex filters, taps, mainline splitters and couplers, hard-line coaxial connections, drops, and home wiring generally remain unchanged. In certain embodiments, the CPE would need to be modified to (i) receive higher band signals not presently delivered as part of legacy, and (ii) to implement multiple access (e.g., TDD) scheme; however, it will be appreciated that such modifications or enhancements to the CPE may actually produce further benefits and advantages. For instance, one such advantage relates to so-called "take rates", where initially the higher data rate service provided by the invention herein would carry a premium price, and thus be subscribed to by a subset of the customer base, making deployment of the costly new CPE "success based." Additionally, the network of FIG. 2, in one embodiment, does not use spectrum greater than 1 GHz, and benefits from this quality in that much of the presently installed equipment is capable of operation up to this frequency and thus need not be modified.

The illustrated embodiment is also more reliable, because the fiber utilized therein is inherently less susceptible to issues such as loose connections and corrosion (as compared to the RF electrical coax network). In the inventive system, RF electrical signals are first generated at the transceivers inside amplifiers 206, and thus problems with RF transmission in the electrical network are isolated only to those sections between the nearest amplifier 206 and customers associated with the output side of that specific amplifier (and not with the remainder of the network). While these benefits have been present in prior art systems such as the aforementioned "Node plus zero" HFC designs described supra, the present invention advantageously maintains the capacity to transmit legacy signals which retain carriage across the HFC cascade, while new signals are generated at each amplifier's ONU, which was not known in the prior art.

It will be appreciated that the exemplary embodiments of the network described herein are effectively transparent to legacy services; the new data service disclosed herein is "overlaid" on top of the existing network.

Content (e.g., audio, video, data, files, etc.) is provided in each downstream (in-band) channel associated with the relevant service group. To communicate with the headend or intermediary node (e.g., hub server), the CPE may use the out-of-band (OOB) or DOCSIS channels and associated protocols. The OCAP 1.0 (and subsequent) specification provides for exemplary networking protocols both downstream and upstream, although the invention is in no way limited to these approaches or protocols.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In addition to on-demand and broadcast content (e.g., video programming), the exemplary HFC network may also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

The CPE are each configured to monitor the particular assigned RF channel (such as via a port or socket ID/address, or other such mechanism) for IP packets intended for the subscriber premises/address that they serve.

In accordance with another embodiment of the present invention, a "packet optimized" delivery network is used for carriage of the packet content (e.g., IPTV content) when the request issues from an MSO network. In one exemplary implementation of such a network, an IMS (IP Multimedia Subsystem) network with common control plane and service delivery platform (SDP), as described in co-pending U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK" which is incorporated herein by reference in its entirety, is utilized. Such a network provides significant enhancements in terms of common control of different services, implementation and management of content delivery sessions according to unicast or multicast models, quality-of-service (QoS) for IP-packetized content streams, service blending and "mashup", etc.

Exemplary Amplification and Combination Apparatus—

Figure 3:
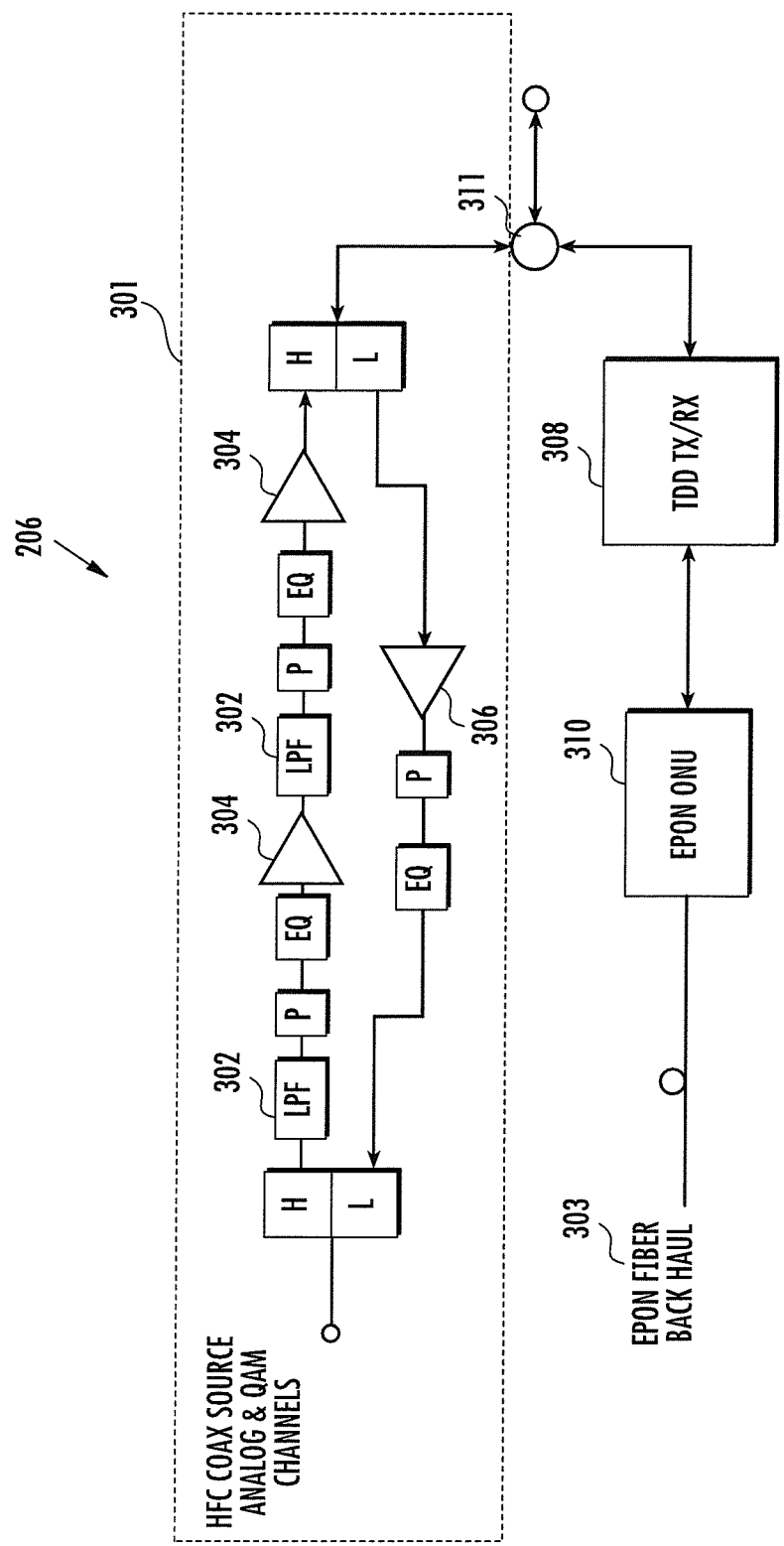
FIG. 3 is a functional block diagram illustrating an exemplary embodiment of a single output amplification and combination apparatus useful in the exemplary networks of FIG. 2.

An exemplary embodiment of an amplification and combination apparatus 206 for use with the network of FIG. 2 is illustrated in FIG. 3.

As shown, the apparatus 206 generally includes an amplifier block 301 with high and low frequency band ports for receiving analog and QAM channels (such as from the node 204). The apparatus 206 further includes an EPON ONU 310 for receiving optical signals from the previously described optical splitter 202. In one embodiment, the ONU 310 comprises a small form factor pluggable (SFP) EPON ONU (so as to facilitate ready integration into existing hardware environments and also provide a spatially compact solution), although other types of equipment and form factors may be used with equal success.

A computer program or application (not shown) running at the apparatus 206 is utilized in the exemplary embodiment to manage frequency band allocation and other functions performed by the apparatus, described in greater detail below.

A wideband converter apparatus associated with the EPON ONU 310 (not shown) converts the optical signals from the ONU 310 to digital (electrical domain) signals, such as may be transmitted over a wireline interface such as GBE/Ethernet or other high-speed data protocol such as IEEE-1394 or Thunderbolt. A time division duplex (TDD) transmitter-modulator/receiver-demodulator, or "transceiver" 308 in communication with the ONU 310 via the aforementioned wireline interface is then utilized to convert the electrical signals received over the wireline interface to RF domain for multiplexing with the legacy RF signals re-generated by the amplifier block 301. These signals are combined into a "single" RF domain signal (i.e., legacy signals residing within the legacy RF frequency bands, and converted optical signals residing within a new band, such as 750 MHz-1 GHz) using the RF splitter-combiner 311, for transmission downstream. The TDD transmitter/receiver 308 (effectively acting as an RF modem) provides full duplex communication dynamically over a time-sharing or half-duplex link. As the amount of data provided upstream or downstream increase, more capacity is allocated to this use. Time division multiple access (TDMA) may also be implemented by the transceiver 308 in at least two respects. Specifically, in a first respect, upstream and downstream utilization/capacity can be "traded off" against each other based on traffic demands (an inherent advantage of TDD). In a second respect, the total network capacity of the invention described herein can be traded off against legacy capacity, and will likely encroach onto legacy spectrum over time (such trading-off made easier via the use of a splitter/combiner of the present invention, versus use of diplex filters in the prior art).

In one embodiment, each amplifier (or alternatively each CPE, depending on which network configuration is utilized) receives ONU downstream signals during a predetermined time slot, or reception by a particular ONU is determined by packet headers. The other amplifiers (or CPE) will not receive a transmission from the EPON splitter when they are not in their predetermined timeslots or when the packet destination headers do not match. In this manner, downstream signals received from the OLT which are marked as having been received during a time slot not associated with the receiving ONU or with packet destination headers not associated with the ONU are simply ignored. This relieves the system of the need to provide filters for the purpose of filtering out the downstream signals of the previous amplifiers which originated from the EPON splitter; packets not destined for a particular ONU are not filtered out in the amplifier, but instead are simply ignored. Notwithstanding, in another embodiment, one or more filters may be implemented for filtering out EPON-originated signals received at a first splitter from being transmitted to other downstream amplifiers.

In the exemplary embodiment, the TDD transceivers 308 advantageously are digital in nature and not analog filter-based, and hence do not have a prescribed frequency band associated with them (at least within the limits of their operation). This use of digital technology provides significant benefits in terms of both simplicity and the ability to retask or reprogram the TDD devices 308 (such as via the aforementioned computer program) for different frequency bands without having to adjust or change filters. For instance, in one implementation of the invention, the currently unused frequency band from about 750 MHz to 1 GHz is programmed by a technician or network operator to be used by the TDD for delivery of services in addition to the existing legacy bands (below 750 MHz). In one variant, the TDD comprises an orthogonal frequency division multiplexing (OFDM) apparatus capable of making time-to-frequency domain conversions, such as by using an IFFT, and transmit these signals over prescribed frequency bands selected by the user (to be combined with legacy signals by the combiner 311 as previously discussed).

The foregoing reprogrammability feature also supports expansion of services from the standpoint that when bandwidth associated with a given node reaches capacity (i.e., when the aforementioned 750 MHz to 1 GHz band is saturated), extant legacy QAMs can be dropped in favor of making more room for the new band(s), and the TDD merely preprogrammed to utilize a wider bandwidth (e.g., 700 MHz to 1 GHz). Such capability is not possible with prior art filter-based solutions.

In order to avoid the transmission of downstream TDD signals upstream, one or more pluggable (or electronically switchable) low pass filters (LPFs) 302 are utilized within the amplifier block 301 before and/or after an amplification process 304. Thus, sub-low reverse TDD signals are blocked by the LPF 302 in the amplifier 301. Amplification of upstream signals may also be accomplished via an upstream amplification process 306 if desired. Additional pluggable or electronically switchable LPF and HPF filters may optionally be included. A HPF (not shown) may be included prior to or within TTD TX/RX 308 to protect the receiver therein from overloads caused by high-powered signals coming from the output of amplifier block 301 via the isolation path through splitter/combiner 311. A LPF (also not shown) may be included at or in the signal path after the output of amplifier 304 prior to the connection to splitter/combiner 311 in order to prevent out-of-band noise, spurious, and distortion products present in that output signal from affecting receiver circuitry in 308 via the isolation path of splitter/combiner 311. Implementation of separate HPF and LPF filter sections will facilitate design of pluggable and electronically switchable options not practical with traditional combined diplex filter designs, with advantageous reduction in the amount of spectrum lost to filter slope characteristics.

Hence, the amplification and combination apparatus 206 is able to provide an RF output comprised of (i) downstream RF (e.g., QAM/analog) signals received from the node 204 of FIG. 2, and (ii) downstream RF signals converted from optical signals received at the apparatus 206. The combined downstream signals are provided to devices/homes 208 directly in communication with the apparatus 206, as well as to the rest of the amplifier cascade. Additionally, the amplification and signal combination apparatus 206 provides upstream signals which have been filtered in order to avoid communication of signals intended only to be sent downstream.

The upstream signaling process in the present invention also allows for utilization of a lower output power client device than was necessitated in the prior art (see FIG. 1). Specifically, a TDD system (for a given burst rate tier offering) requires less spectrum as forward and reverse transmissions "take turns" achieving the burst rate. Since less spectrum is consumed, the maximum frequency required for transmission to be performed is lower, and at lower frequencies, cable losses are lower and thus power output requirements are also lower. The TDD return path modem in the amplifier is configured to transmit the upstream signal from that point back upstream to the network.

In another variant, the EPON fiber backhaul 303 may advantageously share extant HFC fiber using a shared medium technique, such as e.g., wave division multiplexing (WDM) or dense WDM (DWDM). For example, various extant systems may be utilized for multiplexing a number of optical carrier signals onto a single optical fiber by using different wavelengths of light. Thus, the present system is able to provide bidirectional communications, and will accommodate simultaneous transmission of linear modulated legacy HFC signals along with 1 Gbit/s and/or 10 Gbit/s EPON signals over one strand of fiber.

FIGS. 3a-3d illustrate additional exemplary embodiments of the amplification and combination apparatus.

Figure 3A:
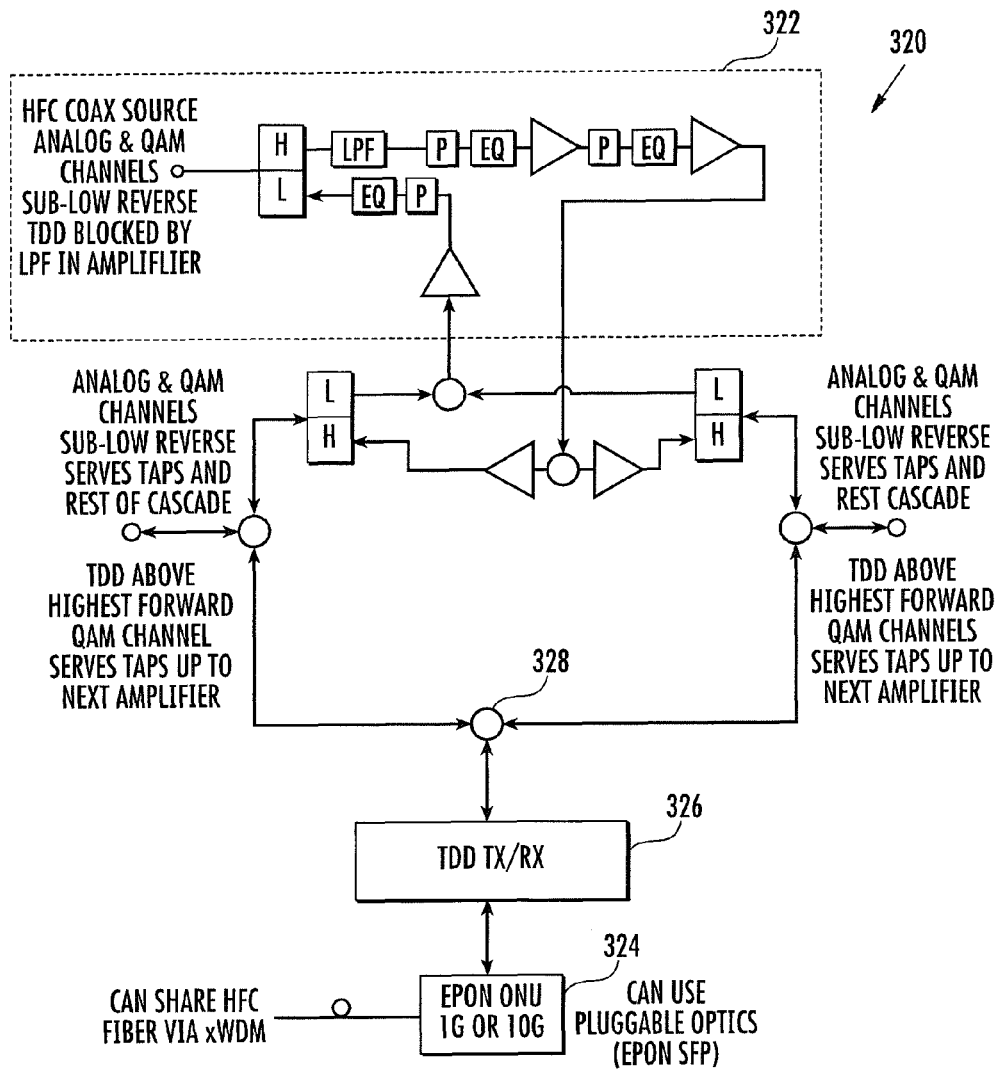
FIGS. 3a-3d are functional block diagrams illustrating various exemplary embodiments of the amplification and combination apparatus of FIG. 3.

Specifically, FIG. 3a illustrates an exemplary two-output amplifier. Similar to the embodiment of FIG. 3 above, the variant illustrated in FIG. 3a generally includes an amplifier block 322. In this implementation, analog and QAM signals share the legacy forward signal path; once combined at the distribution hub, they enter/exit via shared ports, and stay combined to the customer premises. This combined path appears at two separate amplifier housing ports in order to attain higher total housing output power that are not possible with a single output due to gain block overload; this dual-output technique is in common use, and this invention accommodates continued use of this topology. The apparatus 320 further includes an EPON ONU 324 for receiving optical signals from the previously described optical splitter.

As discussed with respect to the embodiment above, the apparatus 320 manages frequency band allocation and other functions. Additionally, a wideband converter apparatus associated with the EPON ONU 324 (not shown) converts the optical signals from the ONU 324 to digital (electrical domain) signals. A TDD transmitter/receiver 326 in communication with the ONU 324 then modulates the digital baseband electrical signals to RF domain for combining with the legacy RF signals generated by the amplifier block 322. These signals are combined into a single RF domain signal within a new band using the RF combiner 328, for transmission downstream. In one variant, the TDD provides data service in a frequency band above the highest extant QAM channel.

In the illustrated embodiment, the combined signal is transmitted via two outputs to two different downstream devices. Additionally, the TDD 326 may be reprogrammed (i.e., the frequency band utilized may be changed or moved) easily by reprogramming the TDD 326, or alternatively via proper LPF selection. In one exemplary practical implementation, when both the upconversion and downconversion circuitry in the TDD 326 would be re-programmed, the filters would be re-programmed or physically changed (including e.g., additional LPF and HPFs discussed supra that would also likely be re-programmed or changed.

Figure 8:
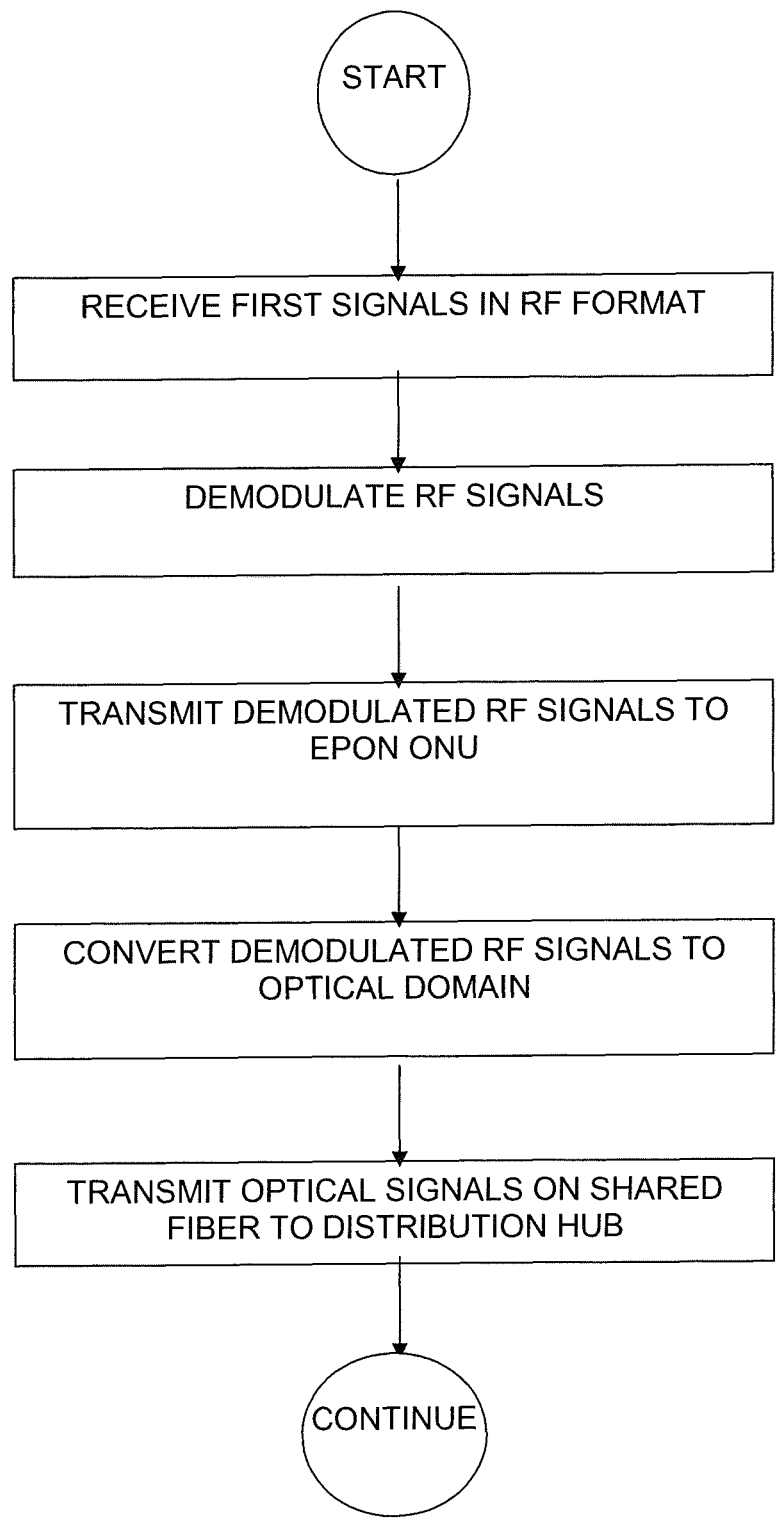
FIG. 8 is a logical flow diagram illustrating an exemplary method for providing signals upstream according to the present invention.

It will also be appreciated that while the foregoing description relates to an exemplary downstream TDD process, the upstream process simultaneously benefits from this reprogramming capability. Specifically, the TDD device in one exemplary upstream approach is timeslot-switched to receive mode, and instead of acting as a modulator, instead acts as an RF demodulator, providing the demodulated digital baseband signals to the EPON ONU for conversion to the optical domain for transmission on the shared fiber back to the distribution hub. Re-programming of the TDD device to increase occupied spectrum increases both downstream and upstream capability. See the exemplary method of FIG. 8 presented herein.

Figure 3B:
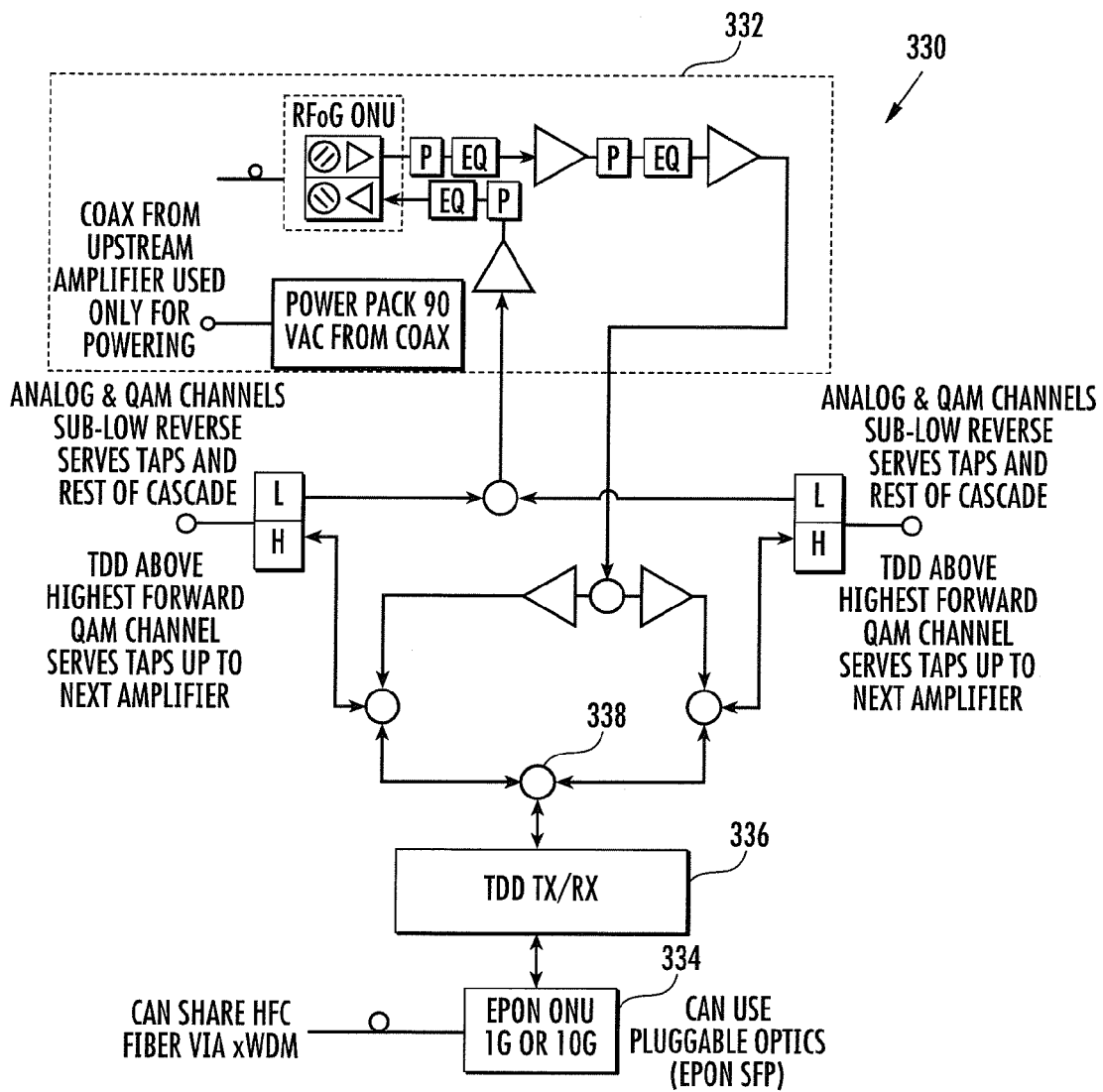

FIG. 3b illustrates an exemplary two-output amplifier converted to a two-way node. The embodiment of FIG. 3b is similar to the embodiment of FIG. 3 above, in that the illustrated variant generally includes an amplifier block 332 with high and low frequency band ports as previously described herein. It will be appreciated that in one implementation, the ports referred to herein comprise external housing ports, and hence also connect both upstream and downstream signals. Alternatively, the ports are utilized for connection of internal systems (such as the RFoG ONU shown), and the high and low frequency ports are used for legacy downstream and legacy upstream, respectively.

The apparatus 330 also includes an EPON ONU 334 for receiving and transmitting optical signals through the optical splitter. The apparatus 330 operates within the frequency band allocation (see discussion above). Additionally, the EPON ONU 334 further comprises a converter apparatus which converts optical signals to digital signals. Lastly, a TDD transmitter/receiver 336 (in communication with the ONU 324) e-modulates the electrical signals to RF domain for combining with the legacy RF signals re-generated and/or boosted in power by the amplifier block 332. A new band is combined with the currently/previously occupied legacy spectrum to form a full spectrum signal using the RF combiner 338, for transmission downstream. In the illustrated embodiment, the combined signal is transmitted via two outputs to two different downstream devices.

In terms of upstream transmission, signals entering the external amplifier housing port are split, and a portion of the incoming combined signal power is supplied to the TDD transceiver, such as e.g., via an HPF (not shown) disposed between the splitter and the TDD, as described previously herein. The signals are demodulated to digital baseband, and supplied to the EPON ONU where it is modulated on the ONU-provided laser to be combined using an external passive wavelength multiplexer for transmission on the shared optical fiber back to the distribution hub. See the exemplary method of FIG. 9 herein.

In the illustrated embodiment, RFoG replaces sub-low return and legacy forward. In the illustrated embodiment, the RFoG ONU provides legacy signal connectivity for signals (separate wavelengths are provided for downstream reception and upstream transmission) that would otherwise enter the amplifier housing's external forward input port. RFoG carries linear signals, and is thus capable of replacing this connectivity without further conversion. In RFoG, both forward and reverse RF signals are directly applied to a linear laser's bias circuit (the downstream laser is in one implementation located in the distribution hub, upstream laser is in the RFoG ONU), which causes the light to carry the RF channels "on frequency." One advantage to this approach is that reception is possible with a simple photodiode detector, and requires no demodulation or demultiplexing circuitry. In this regard, the RFoG ONU functions as a low-cost, miniaturized version of the HFC node. However, it is different from the HFC node in that the RFoG system has multiple endpoints (advantageously with an identical fan-out as EPON) so it is well suited for use with the EPON topology.

As a brief aside, the telecommunications industry has coordinated an optical wavelength plan to permit simple optical domain multiplexing of RFoG light signals with EPON light signals on the same strand of glass, using pre-defined standards-based optical wavelength "colors." Legacy signals that were previously optical-to-electrical and electrical-to-optical at the node housing (and repeated through multiple electrical RF repeater amplifiers) go through conversions at each (of up to 32) amplifier(s) under the aforementioned plan, thereby effectively isolating each of the amplifier's downstream customer connections from the next amplifier's connections. Both sets of wavelengths (RFoG upstream and downstream, EPON upstream and downstream) traverse the same passive optical 32-way splitter, thus simplifying optical connectivity via this shared infrastructure topology. Specifically, extant RFoG technology provides bi-directional connectivity between a single point (e.g., a distribution hub) and multiple endpoints (e.g., homes). The exemplary uses of RFoG as set forth in the exemplary embodiments herein would connect a hub to multiple amplifiers, each of which would serve multiple endpoints (e.g., homes). Using RFoG to the amplifier serves to subdivide the service group, and eliminates the need for signals to traverse the cascade, with potentially improved signal quality and reliability.

Additionally, in one embodiment, the TDD provides data service in a frequency band above the highest QAM channel. Further, the illustrated apparatus 330 has the ability to change or modify frequency band utilized without a "truck roll" or otherwise physically modifying the amplifier.

Figure 3C:
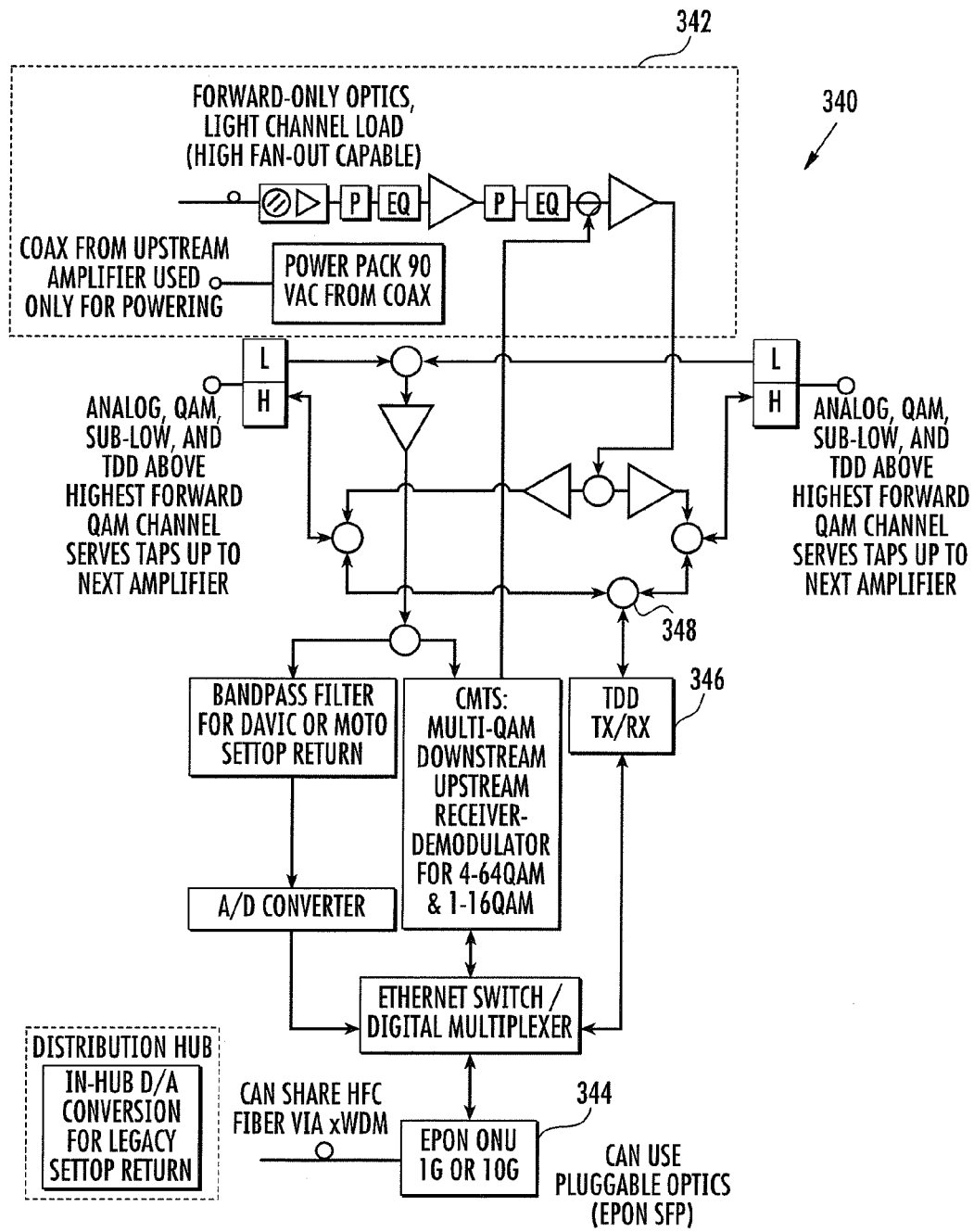

FIG. 3c illustrates an exemplary two-output amplifier converted to a one-way node. The embodiment of FIG. 3c, similar to the embodiments discussed above (see e.g., description of FIG. 3 above), generally includes an amplifier block 342 with ports which output all bands. While the repeater amplifier section carries only legacy forward signals in the embodiment of FIG. 3c, the new circuitry added by the invention hereof provides separate gain stages for upstream and downstream legacy bands using traditional diplex filtering to separate these sections.

The apparatus 340 also includes an EPON ONU 344 for receiving optical signals from and transmitting signals to the distribution hub OLT port via the optical splitter. The EPON ONU 344 converts the received optical signals to baseband digital signals. A TDD transmitter/receiver 346 modulates these electrical signals to RF domain for combining with the legacy RF signals re-generated and/or boosted in power by the amplifier block 342. The legacy signals remain in the two legacy bands, typically upstream (5-42 MHz) and downstream (54-750 MHz); only the newly added TDD signals occupy new "new band" spectrum (and even this is not a requirement, as they could instead displace QAM signals already being carried in "existing band" spectrum between 750 MHz and 1 GHz.). The combined signal is transmitted downstream. Again, in one embodiment, the TDD provides data service in a frequency band above the highest QAM channel. In the illustrated embodiment, the combined signal is transmitted via two outputs to multiple downstream devices. As previously noted, the purpose of two outputs of the exemplary embodiment is not to serve two devices (although this may be an ancillary function), but rather to enable greater total transmission power by segmenting the service area.

CMTS and DAVIC A/D may also be used to replace sub-low return and legacy forward. Specifically, in order to eliminate the need for legacy upstream, one embodiment of the invention, this communication path is replaced with alternative means to connect to these legacy devices. One approach is to quantize (perform A/D conversion to) the RF signals in the amplifier or node, transmit them over the EPON link to the hub, and reconstitute the RF signals using D/A conversion in the distribution hub. While this approach carries incremental cost, such cost is at least partially offset by savings in not needing a return linear laser transmitter, and is of particular value in the context of the present invention because it eliminates the need to continue to support the legacy diplex filtering requirement in the repeater amplifiers. Moreover, reliability and power consumption are improved.

Further, the illustrated apparatus 340 also has the ability to change or modify frequency band utilized without a truck roll or otherwise physically modifying the amplifier akin to the embodiments previously discussed.

Figure 3D:
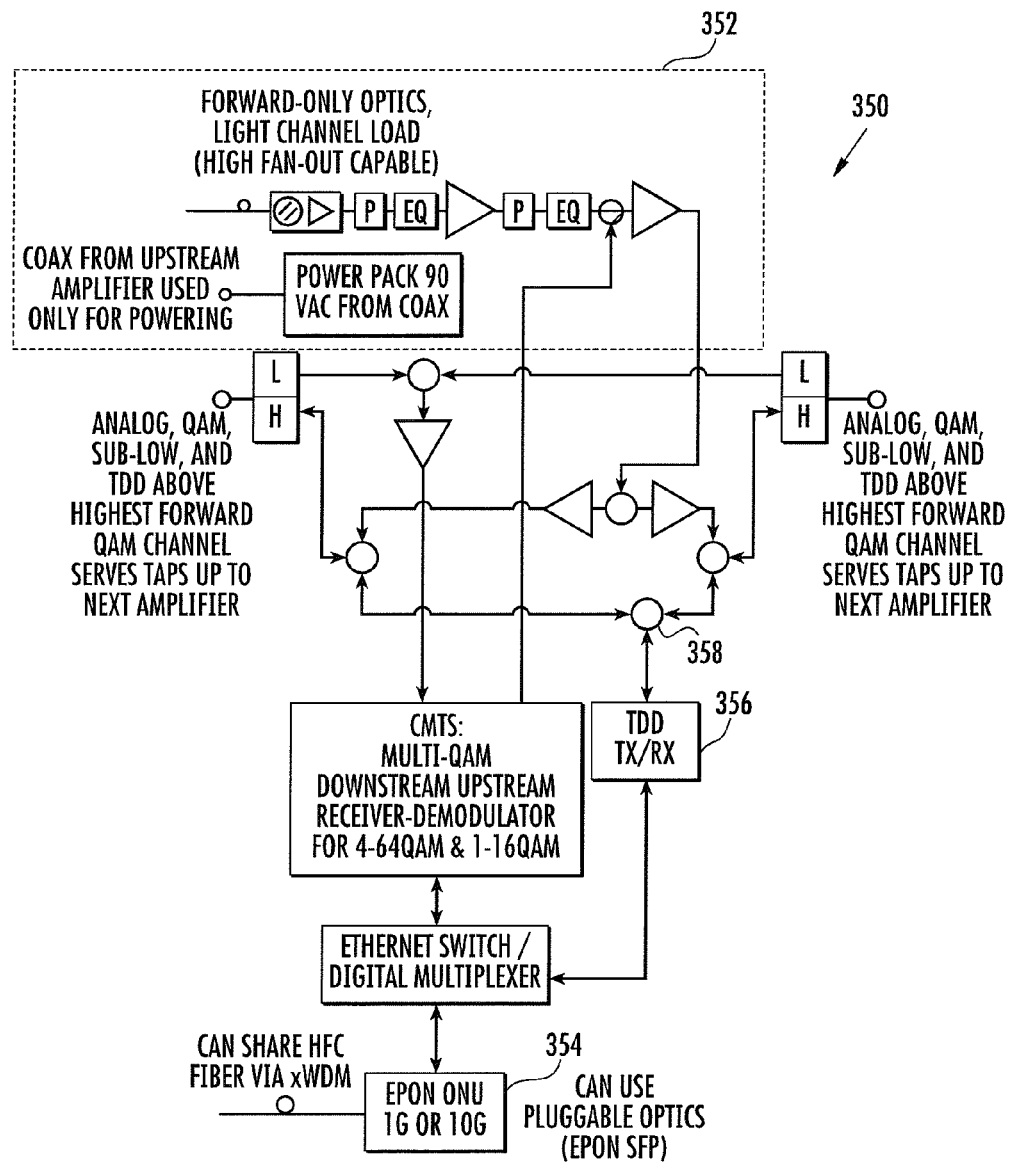

FIG. 3d illustrates a two-output amplifier converted to a one-way node. In this case, legacy upstream DOCSIS connectivity is provided via inclusion of a CMTS (or at least the upstream portion of the CMTS). If the CMTS is located in the amplifier/node but no upstream DAVIC connectivity (as in FIG. 3c) is provided, legacy set-tops must be replaced, as DAVIC set-tops cannot operate without an upstream connection. The A/D scheme shown in FIG. 3c can provide such functionality, as could other demodulation-remodulation methods, or inclusion of a DAVIC receiver alongside the CMTS.

The embodiment of FIG. 3d, similar to the embodiments discussed above (see e.g., description of FIG. 3 above), includes an amplifier block 352 for receiving analog and QAM channels and outputting an RF signal. The apparatus 350 also includes an EPON ONU 354 which receives optical signals from the EPON OLT in the distribution hub via the optical splitter, and converts the received optical signals to digital signals. A TDD transmitter/receiver 356 converts the electrical signals to the RF domain for multiplexing with the legacy RF signals (generated by the amplifier block 352). The RF combiner 358 combines these new-band signals with legacy-band signals, and the combined signal is transmitted downstream. As with prior embodiments, the TDD provides data service in a frequency band above the highest extant QAM channel. In the illustrated embodiment, the combined signal is transmitted via two outputs to multiple downstream devices. As discussed previously herein, in the case of the inverse (upstream), upstream TDD-band signals enter the housing and are conveyed upstream on the EPON system.

In the illustrated embodiment, the CMTS and required DOCSIS Set-top Gateway (DSG) are used to replace functionality provided by the prior art sub-low return path. The DSG is a type of set-top with a DOCSIS chipset that can transmit upstream to a CMTS, and thus does not require a DAVIC connection. Deployment of a CMTS, and change-out of DAVIC-only set-tops to DSG-capable set-tops, allows elimination of the sub-low return path that is presently diplexed alongside the forward legacy signal path through the repeater amplifier cascade in both directions, thus enjoying the aforementioned advantages that accrue from elimination of this path.

Similar to the embodiments discussed above, the illustrated apparatus 350 has the ability to change or modify frequency band via the aforementioned reprogrammability functionality.

FIG. 3e illustrates examples of how legacy bandwidth can be progressively harvested over time using the "ability to change or modify frequency band" feature of the present invention.

Interference and the Low Pass Filtering—

One salient consideration with the foregoing architecture is signal interference. Specifically, by running optical fiber to each node and utilizing the aforementioned amplification and combination apparatus 206 to inject additional (e.g., higher) frequency band signals over top of the legacy signals, interference is created due to, inter cilia, the amplification of the injected high-band signals and the amplified signals being passed to nodes downstream in the cascade (which themselves may inject additional signals and/or amplify the passed-down signals). This interference must be accounted for the system to operate correctly.

Referring now to FIGS. 4a through 4f, various scenarios where upstream and/or downstream communications can interfere with upstream and downstream communications in the network are discussed in detail.

Figure 4A:
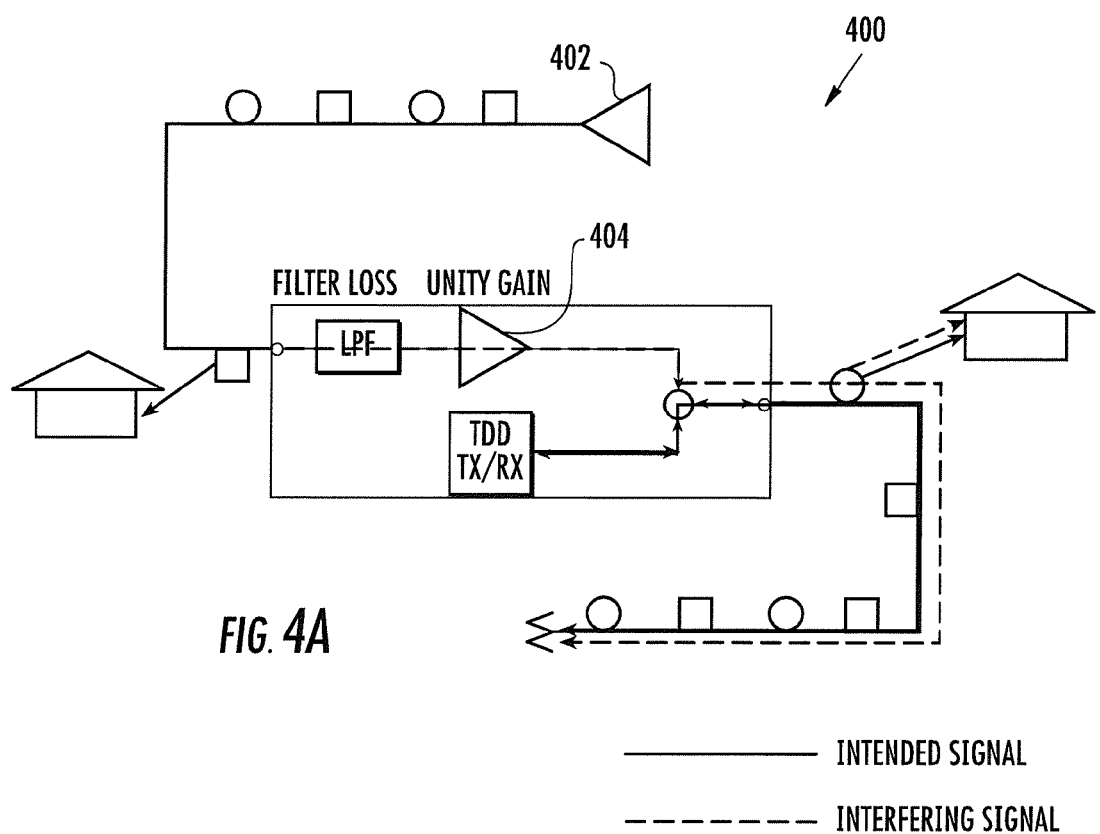
FIGS. 4a-4f are functional block diagrams illustrating various operational scenarios in which the networks of FIGS. 2 and 3 may experience interference.

FIG. 4a illustrates interference of a downstream signal originated from a first amplifier in a cascade 400, the downstream signal being transmitted by the next amplifier. In one embodiment, the interference power ratio range is equal to the filter loss plus or minus (+/−) 15 dB. In the illustration, the first amplifier in the cascade 402 is the interfering transmitter, and may be at maximum or minimum power at the time the interference event occurs. The second amplifier in the illustrated cascade 404 is the desired modem, which may also be at maximum or minimum power at the time the interference event occurs. The level of interference depends on the filter loss and on which modem is being transmitted to at a given time. In a best case scenario, the interference event occurs when the interfering transmitter 402 is at minimum power, and the desired modem 404 is at highest link loss location. The worst interference event occurs when the interfering transmitter 402 is at maximum power, and the desired modem 404 is at lowest link loss location (i.e., minimum desired transmission power).

Figure 4B:
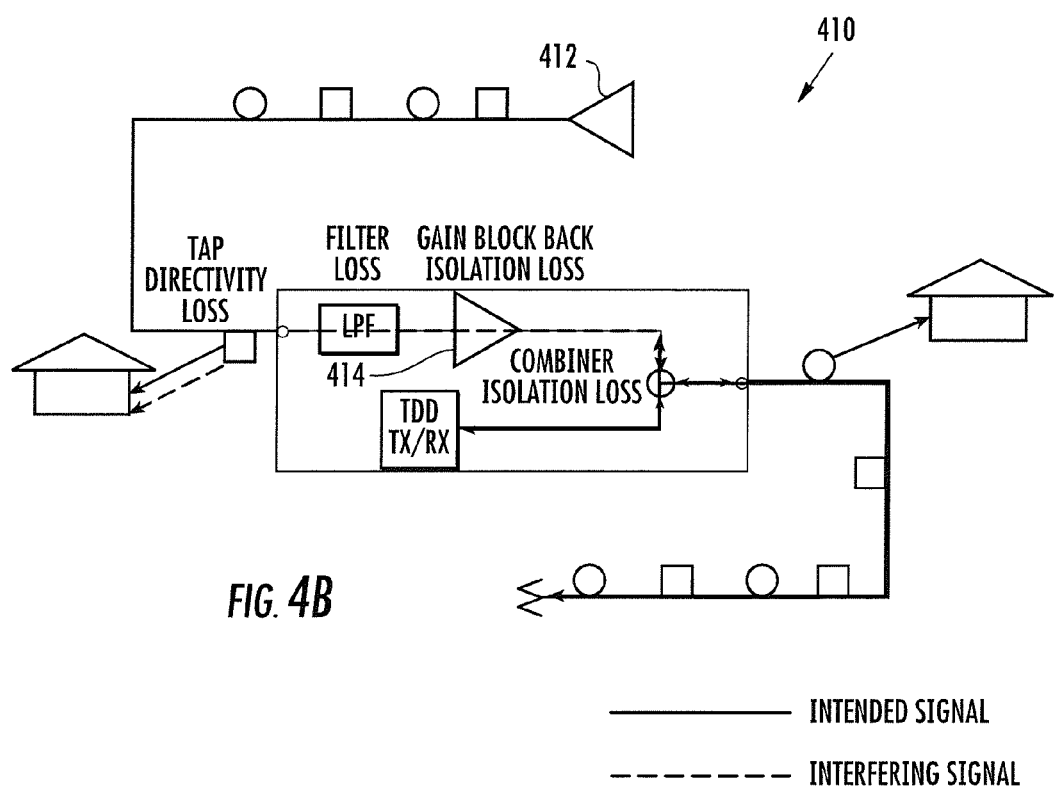

FIG. 4b illustrates interference of a downstream signal from an amplifier 414 in a cascade 410 with a downstream signal transmitted from a previous amplifier 412 in the cascade. The interference power ratio range is, in one embodiment, equal to the complex path loss shown in FIG. 4b, plus or minus (+/−) 7.5 dB. The desired power of the receiving amplifier is 0 dBmV. At worst, an interference event will occur when the TDD is at a maximum power for transmitting signals out while taking into account: combiner isolation loss, back isolation of gain blocks, filter loss, main coax loss, tap directivity loss, tap value loss, drop coax loss, and modem splitter loss. The dBc being above 0 dBmV for receiving power is also a consideration. In the best case scenario, the interference event is similar to the worst case discussed above, minus the worst case power range.

Figure 4C:
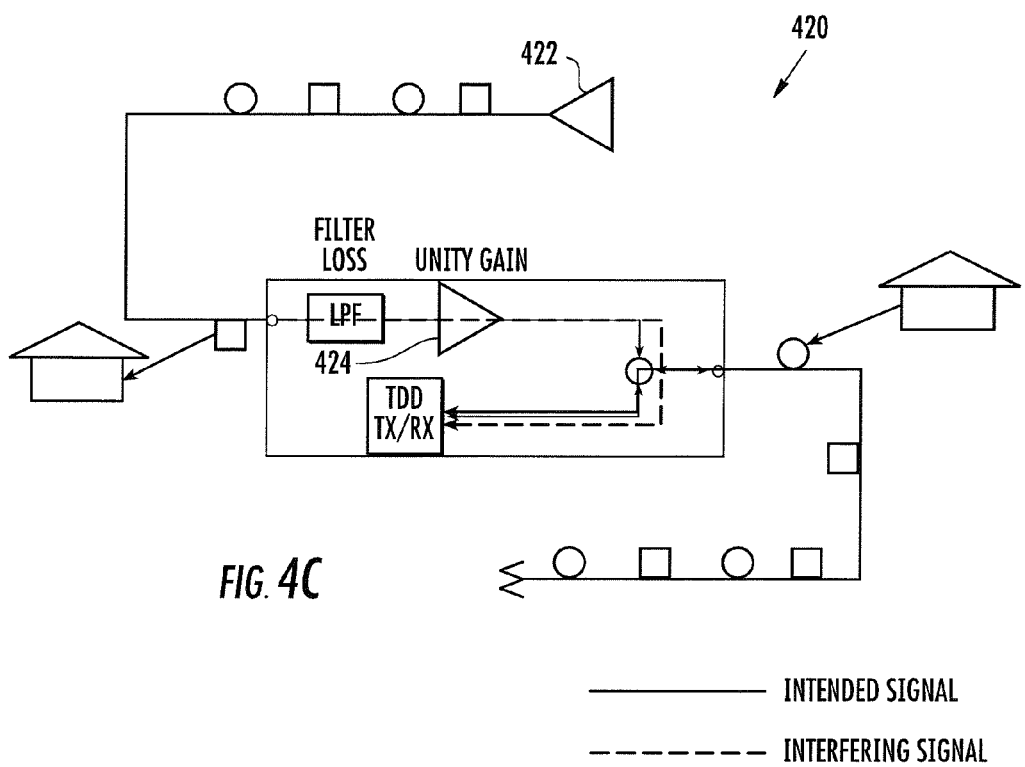

FIG. 4c illustrates interference of a downstream signal from a first amplifier 422 in a cascade 420 with an upstream signal from a device associated with a second amplifier 424 in the cascade. The interference power ratio range is, in one embodiment, equal to the maximum TDD transmit power minus the filter loss and combiner isolation loss (about +/−15 dB). As illustrated, the interference level depends on filter loss and which modem is being transmitted to at a given time. The desired power of the receiving amplifier is 0 dBmV. The worst case interference occurs when the TDD transmitter is at maximum power, less filter loss and combiner isolation loss. The best case interference event is similar to the worst case minus the power range.

Figure 4D:
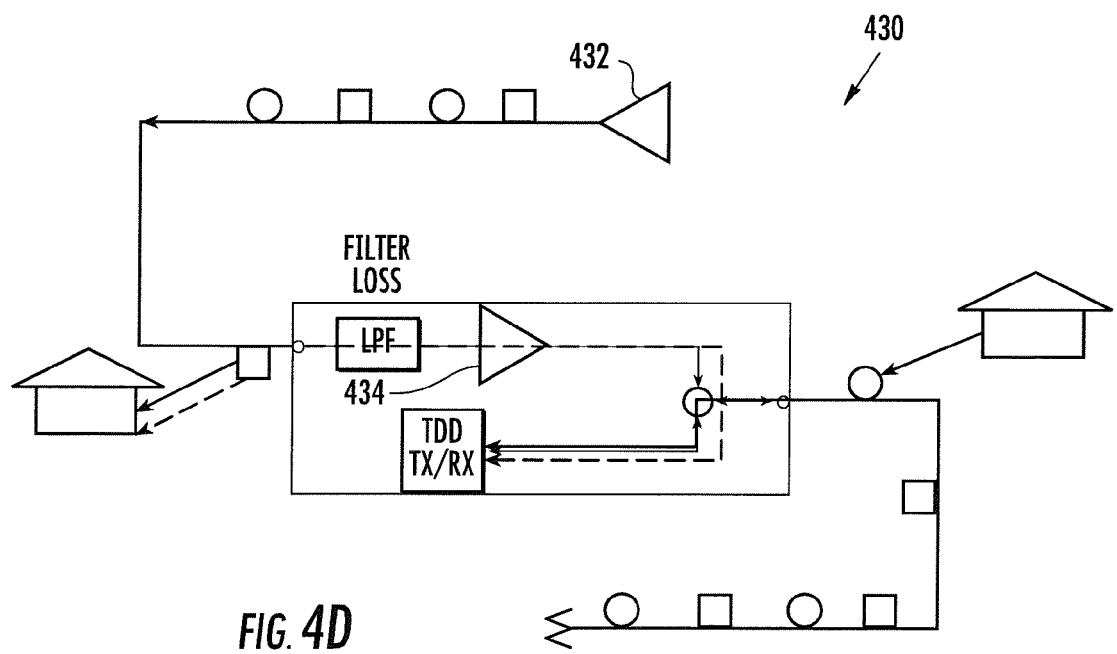

FIG. 4d illustrates interference of an upstream signal from a device associated with an amplifier 434 in a cascade 430 with a downstream signal transmitted from a previous amplifier 432 in the cascade. In one embodiment, the desired and interfering signals are both fixed (0 dBmV) and the interference ratio is substantially equal to the listed path losses to a given victim. The victim locations nearest to the amplifier inputs experience the worst interference; interference lessens with increasing path loss. For all of the interference events in the illustrated example, the gain block output is 0 dBmV, less back isolation of gain blocks, filter loss, main coax loss, tap directivity loss, tap value loss, drop coax loss, and modem splitter loss. The dBc being above 0 dBmV for receiving power is also a consideration.

Figure 4E:
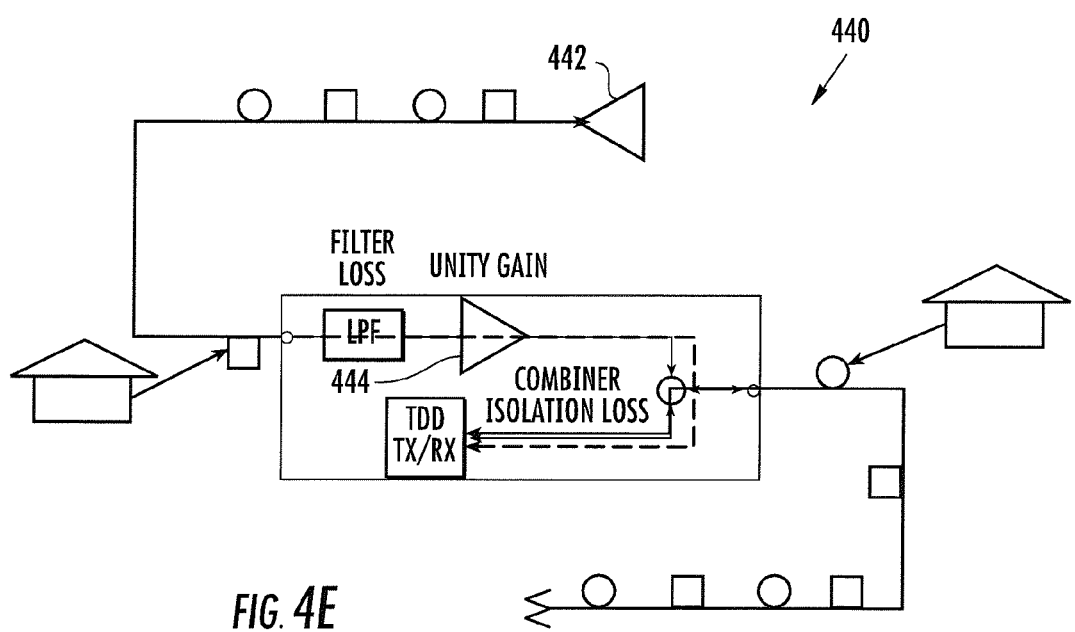

FIG. 4e illustrates interference of an upstream signal from a device associated with a first amplifier 442 in a cascade 440 with an upstream signal from a device associated with a second amplifier 444 in the cascade. The desired power of the receiving amplifier is 0 dBmV. All interference power levels up to worst case are possible in this example. Further, the worst case event is identical for all victim transmissions. The worse case event occurs when the TDD modem uses maximum power for upstream transmissions taking into account drop splitter loss, drop coax loss, tap value loss, tap directivity loss, main coax loss, filter loss, amplifier gain, and combiner isolation loss. The dBc being above 0 dBmV for receiving power is also a consideration.

In one embodiment, the worst case transmitter is located at a maximum link loss location, has a low tap value, a low drop loss, and is located at the tap nearest the amplifier input.

Figure 4F:
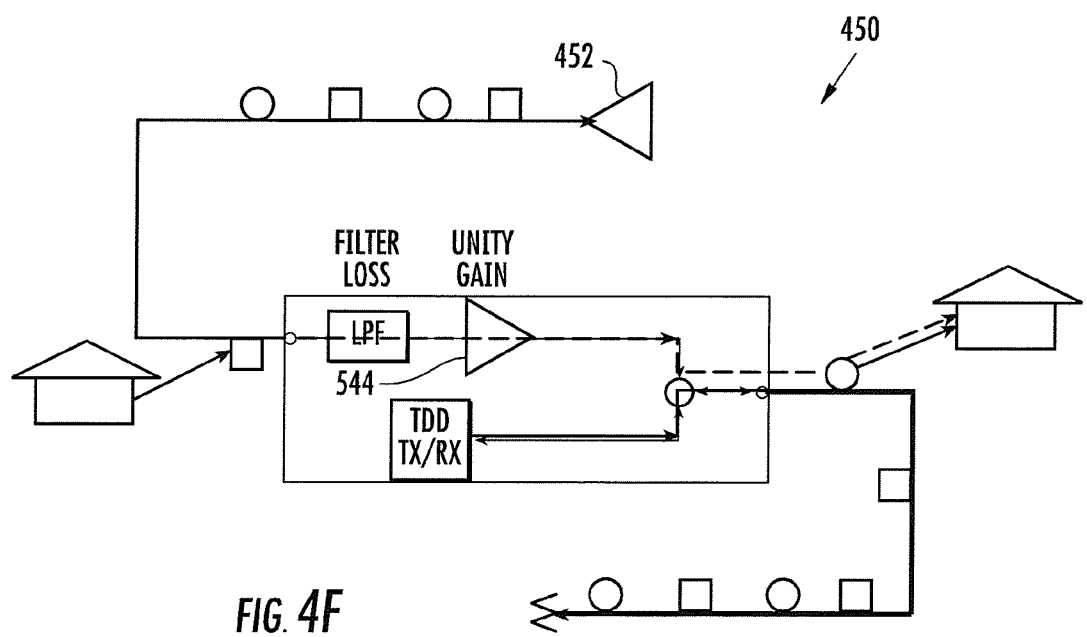

FIG. 4f illustrates interference of an upstream signal from a device associated with a first amplifier 452 in a cascade 450 with a downstream signal from a second amplifier 454 in the cascade. In this example, all interference power levels up to worst case are possible. The worst case event is identical for all victim receivers and occurs when the TDD modem uses maximum power for upstream transmission taking into consideration drop splitter loss, drop coax loss, tap value loss, tap directivity loss, main coax loss, filter loss, and amplifier gain. The dBc being above 0 dBmV for receiving power is also a consideration.

In one scenario, the worst case occurs with the desired TDD transmitter at the bottom of its range. The worst case interference occurs when the transmitter is located at a maximum link loss location, has a low tap value, low drop loss, and is located at the tap nearest the amplifier input.

In one embodiment of the invention, the aforementioned interference scenarios are addressed by way of a time sharing or TDD scheme in which the timing of the transmission of the digital packets associated with content streams is controlled across the entire cascade (or at least any portions which may be affected by interference of the type described above) so as to provide available transmission windows or slots for each node. Hence, in one implementation, the various amplification/combination nodes 206 (FIG. 2) of the network are synchronized to a common time base or clock, and each is assigned one or more slots within a prescribed time map within which to transmit its content packets.

At the premises (receiver 208) side, the exemplary CPE used to receive the high-band signals includes TDD mapping capability, such that the CPE is capable of synchronizing with the slot(s) allocated to its servicing node 206 so as to receive information destined for that CPE. For example, if a given premises (CPE) is serviced by Node A of the network, and Node A is assigned a time slot of $t_1$ for transmission of high-band signals, then the TDD mapping function in the CPE will in one embodiment discard all packets received outside of that time window (as they would be associated with a distribution node which is not their host or parent node.

It Will also be appreciated that under exemplary configurations of the invention, packets received outside the aforementioned window will not be degraded, but they are not useful in that they are not intended for the customers in that subsection of the network. However, the present invention contemplates utilization of such packets to allow an exception for multicast downstream packets, which offers efficiencies of transmission. Specifically, in one implementation, only the furthest upstream TDD transceiver is allowed to transmit multicast packets. These packets traverse the entire repeater amplifier cascade, which is beneficial because multiple endpoints may be viewing identical material, such as a live sports event, newscast, or other broadcast services.

It is recognized, however, that under this alternate configuration, certain amplifier distortion performance advantages of not carrying such out-of-window packets would become unavailable. Specifically, if it is important for these signals to be made available, then the option of filtering them out is not available. Filtration of these signals before they impact the solid-state output gain block in the amplifier removes them from the power loading, thus improving linearity of that gain block. If these signals are needed downstream and are allowed to appear at the amplifier output, then the advantage of reduced power loading is lost. This tradeoff may be desirable in some scenarios, however, due to the statistical efficiency advantages of broadcast.

An alternative to the foregoing which may be used consistent with the invention is to supply individual unicast packets to every endpoint, even though they carry identical payloads.

In one implementation, slot allocations are transmitted to the CPE via a downstream message (such as those identifying the controller and/or the client device, and/or which assign the client a downstream receive slot for use (e.g., until a prescribed time), or originated by the relevant node 206 or alternatively a network controller tasked with making slot allocations, so that the CPE is routinely kept abreast of the current slot allocations (which may vary as a function of time in certain embodiments). Multiple TDD-capable Media Access Control techniques for timeslot allocation and/or negotiation recognized and known to those skilled in the art when given this disclosure may be applied for this purpose, or new methods may be developed.

It is noted that existing installations of legacy CPE need not be replaced under the exemplary implementations of the invention, but rather can continue to receive legacy (lower band) signals via their indigenous RF tuners. However, where the capability to receive the new injected (higher band) signals is desired (such as for new customers or during service upgrades), a different CPE can be supplied that includes both tuning apparatus capable of receiving the higher band (e.g., 750 MHz-1 GHz) RF signals, as well as implementing the aforementioned TDD slot mapping logic for the signals.

The temporal allocation scheme may be configured according to any number of different techniques, including e.g., (i) "round robin" (i.e., each node is given a time window in sequence, followed by each of the other nodes, until the first node is reached again); (ii) out-of-order allocation, such as where slot allocation is proportional across nodes, yet may occur out-of-order based on, e.g., a prioritization scheme (iii) size- or bandwidth based allocation (e.g., where the amount of data that a given node must transmit is considered in allocating slots, the allocation which may be disproportional across different nodes); (iv) QoS-based allocation, wherein streams that have QoS requirements associated therewith (such as media streaming timing requirements, channel change latency requirements, etc.) are prioritized and/or allocated more slots disproportionately to other non-QoS streams; (v) historical or speculative/predictive allocation, where slots and/or priority are assigned based on historical, predictive, or speculative models, and so forth.

It is further noted that signals transmitted in the upstream direction generally have no such interference issues, since they merely are "cut off" at the output stage of each amplification and combination apparatus 206, and not propagated further upstream. Hence, the interference management scheme of the exemplary embodiments described herein need not have any upstream mitigation measures, thereby greatly simplifying implementation.

It will also be recognized that while a time division scheme (e.g., TDD) is described with respect to the exemplary embodiments herein, other shared medium access techniques may be used with equal success. For example, in one alternate embodiment, the frequency allocation plan for each amplification and combiner node 206 (i.e., its IFFT/OFDM carrier allocation) is considered in light of the others, so that no two nodes overlap in the frequency domain (effectively tantamount to FDD or frequency division duplexing). For instance, Node 1 might be allocated 750-775 MHz for its carriers; Node 2 allocated 776-800 MHz, and so forth. In this fashion, no time division scheme is needed (bandwidth is constrained in frequency rather than in time). Since the "high band" output of each amplifier/combiner node 206 is in a different frequency band, no mutual interference occurs (assuming sufficient guard bands, etc.). However, it is noted that such approach would not benefit from the shared spectrum burst rate advantage, and would require filters within the transceivers to isolate the bands with the attendant spectrum inefficiencies avoided by other embodiments of the invention.

As yet another alternative, a carrier sense and/or collision-based approach (such as CSMA/CD) can be used to provide access to the high-band spectrum to the various amplifier/combiner nodes 206. For instance, a given node 206 may sample a given carrier (e.g., centered at 900 MHz) to determine if the carrier is in use. Access may then be attempted, and if a collision with another node 206 is detected, a back-off procedure of the type well known in the communication arts applied (e.g., back off for random interval).

As yet a further alternative, the amplifier/combiner nodes 206 may utilize an alternate spread spectrum access technique, such as direct sequence/CDMA.

Home Amplifier—

Figure 5:
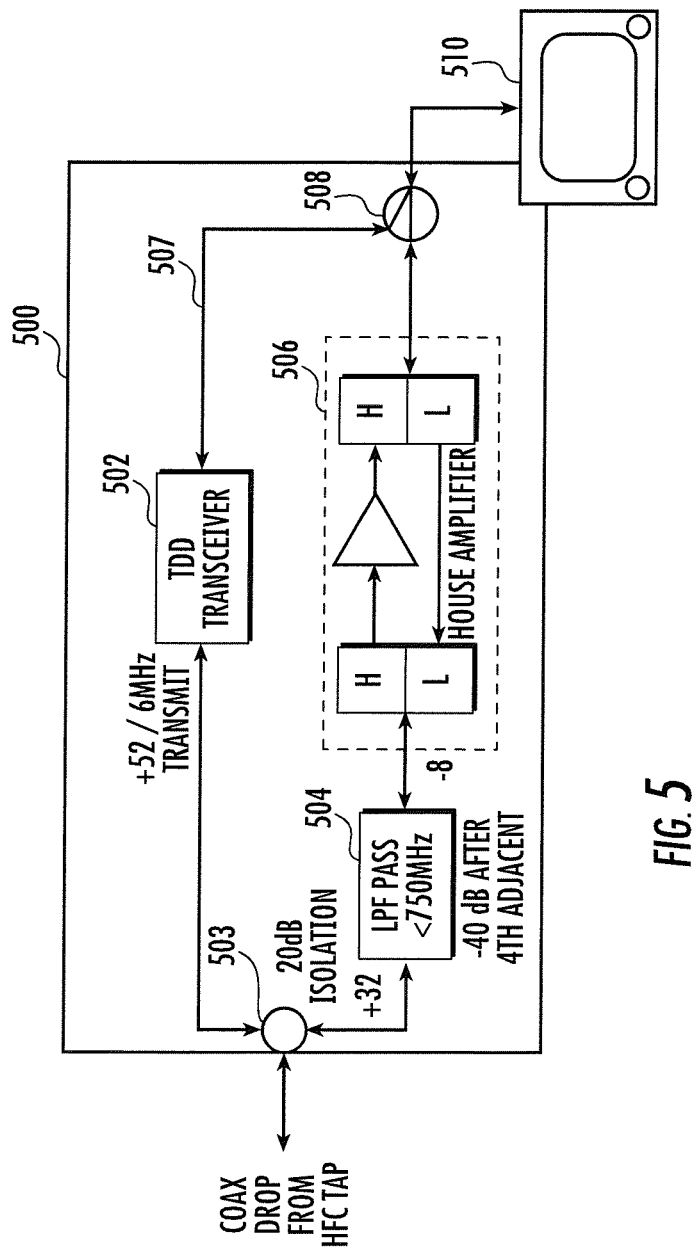
FIG. 5 is a functional block diagram illustrating an exemplary embodiment of a home network utilizing a single output amplifier with a transceiver supporting time division duplexing according to the present invention.

Referring now to FIG. 5, an exemplary amplifier device 500 having a TDD/TDMA transceiver 502 utilized within a home premises is shown and described. As shown, the home amplifier device 500 generally comprises an interface 503 for transmitting and receiving communications from a network.

The illustrated amplifier device is configured to filter the TDD signals before they enter the user device (CPE) used to amplify legacy signals (so as to mitigate interference from the new TDD transceiver transmitting within the receive bands of legacy devices), and also to prevent harmful signals from interfering with AGC control systems in legacy tuner circuitry.

As shown in the illustrated embodiment, an LPF cut to the highest legacy frequency is employed after a two-way splitter but before legacy devices in the home, thus preventing high-powered TDD transmitter output signals that couple across the output to the output isolation path of splitter 503 from interfering with legacy receivers.

Additionally, the apparatus of FIG. 5 advantageously maintains MoCA connectivity by way of the LPF 504 shown, or with use of a band-stop filter (for instance band-stop signals in the 750-1002 MHz range, but band-pass signals on both sides of that range) instead of the LPF shown. Specifically, an additional path 507 from the TDD transceiver 502 to the "backwards" coupler 508 provides a path for any MoCA signals that may be needed between the transceiver 502 and devices within the home, such as legacy set-tops or new IPTV set-tops.

It will be recognized that the coupler 508 could alternately be located at any point after the forward output port of the LPF 504, incorporated into LPF 504's housing, or incorporated into the house amplifier 506, or all three functions combined into one device.

In operation, RF signals are received at the interface 503 (which may comprise an RF tuner) and provided to an amplifier process 506. The amplifier process 506 amplifies the signals and provides these to a combiner 508. From the combiner, the network RF signals are passed to the user device 510.

The TDD/TDMA transceiver 502 at the user premises (within the "MoCA bypass 507"), though illustrated as servicing only one CPE 510 is configured to enable communication between a plurality of devices in the premises network. Since the TDD frequencies are not used for HFC carriers, there is not any on-channel interference.

Specifically, the TDD/TDMA transceiver 502 receives communications from other devices (not shown) in the home network from the interface 503. In one embodiment, the premises communications comprise Multimedia over Coax Alliance (MoCA) communications in accordance with IEEE 802.1 AVB, incorporated herein by reference in its entirety.

The MoCA or other inter-premises communications are managed by the TDD/TDMA device 502. In one variant, the TDD/TDMA transceiver 502 is configured to assign upstream communications between the devices (i.e., inter-premises communication) so that each user device communicating in the home network is allocated a specific frequency. Alternatively, the allocation may be dynamically assigned as the inter-premises communications are transmitted.

To ensure that downstream signals are not improperly transmitted upstream, a low pass filter (LPF) 504 is also provided. A 40 dB LPF, for example, reduces the fourth adjacent carrier to, at worst, a level of −10 dBc. The LPF 504 may also act as a MoCA power over Ethernet (POE) LPF for any MoCA signals present. MoCA signals may further be combined on the TDD input port. If this is done, the LPF 504 instead acts as a band-pass filter (BPF) which blocks signals in the 750 MHz to 1125 MHz range. An additional MoCA POE is then used at the TDD input port.

Power loading in one embodiment is reduced for receiver automatic gain control (AGC) operation, to prevent out-of-band receiver overload and to improve gain block distortion performance. Carriers more distant from the filter band edge are attenuated to a greater extent, further reducing the power loading of gain blocks and any downstream CPE receivers.

There is a large difference in power between the TDD transmit signal and the desired CATV signal. At worst, the difference may be up to 30 dB per channel (assuming 20 dB of splitter isolation). These large differences may be alleviated by, in one embodiment, physically changing-out the LPF 504 as the TDD tier spectrum is expanded. In the instance a very high isolation splitter is used, the loading increase may be insignificant, but very high (e.g., around 40 dBc), which is difficult to achieve. Thus, it may be more practical to include agile filters in combination with a moderate isolation splitter (as opposed to a very high isolation splitter).

The aforementioned expansions to the TDD spectrum do not require a technician to physically modify the system in many instances. The resulting increase to TDD spectrum therefore advantageously avoids costs to the MSO associated with so-called "truck rolls".

Methodology—

Figure 6:
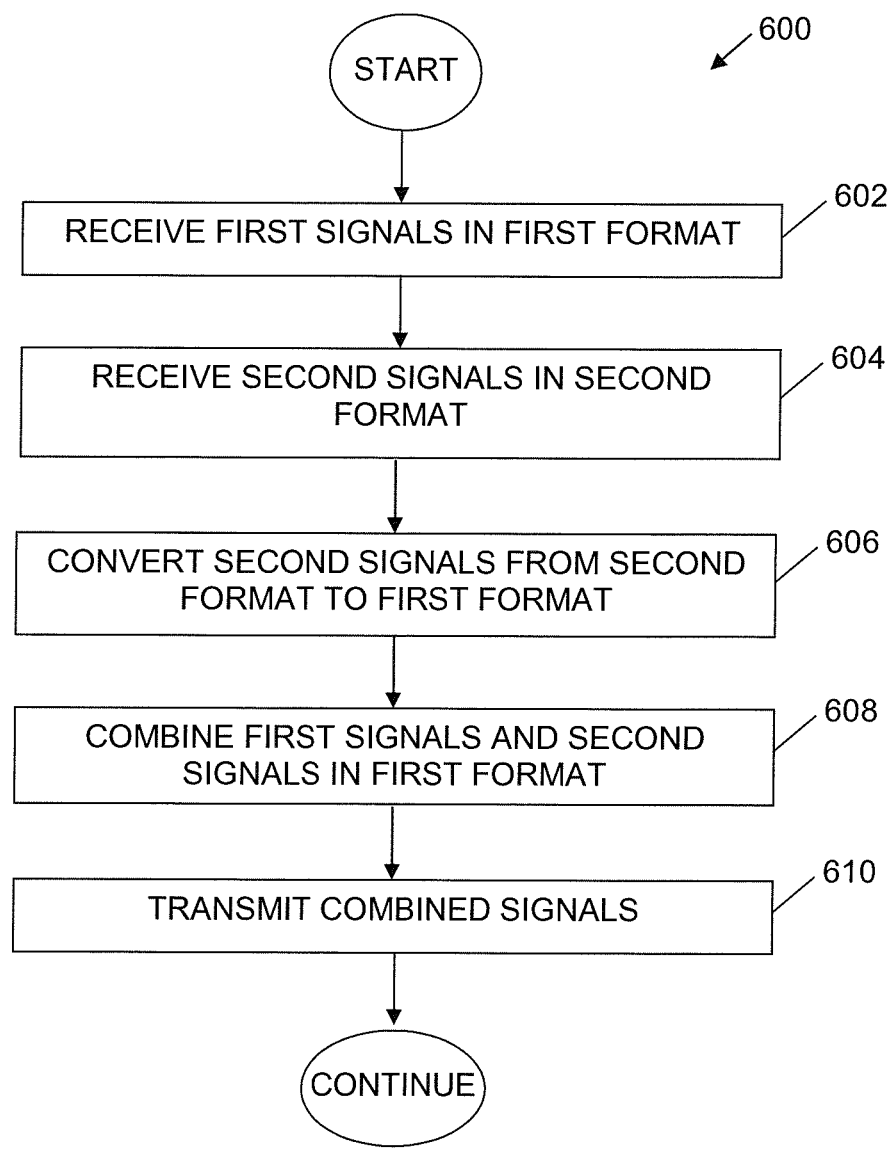
FIG. 6 is a logical flow diagram illustrating an exemplary method for providing content to a plurality of downstream devices according to the present invention.

FIG. 6 illustrates an exemplary embodiment of a method 600 for providing content downstream within a network, in accordance with the present invention. As illustrated, per step 602 of the method 600, first signals are received at an amplification and combination apparatus (such as that of FIG. 3 herein) disposed in a network cascade. The first signals are received in a first "format" or domain; e.g., RF signals are received from the node or another amplifier in cascade. Alternatively, the first signals may comprise optical signals received from an EPON OLT.

Next, at step 604, second signals are received at the amplification and combination apparatus in the cascade. The second signals are received in a second format; e.g., optical signals received from an EPON OLT. Alternatively, the second signals may comprise RF signals received from another amplifier in the cascade or the service node.

At step 606, the second signals are converted to the format of the first signals, or alternatively, the first signals are converted to the format of the second signals, so as to place both signals in a common format or domain. In the instance where the first and second signals are received in the same format (either RF or optical), the step for converting these to the same format may be omitted.

Once the signals are in the same format, they are combined to a single output using a combiner (such as the RF domain combiner 311 of FIG. 3) per step 608.

In yet another embodiment, once combined, the signals are converted. For instance, the first and second signals may be combined to produce RF signals as above, but then are further converted to optical domain signals for distribution via an optical medium (e.g., FTTH or FTTC). Various other alternatives are appreciated given the present invention, the foregoing being merely illustrative.

At step 610, the combined (and optionally converted) signal output is transmitted to a plurality of devices in the network including e.g., user devices (CPE) and other amplifier devices downstream in the cascade.

Figure 7:
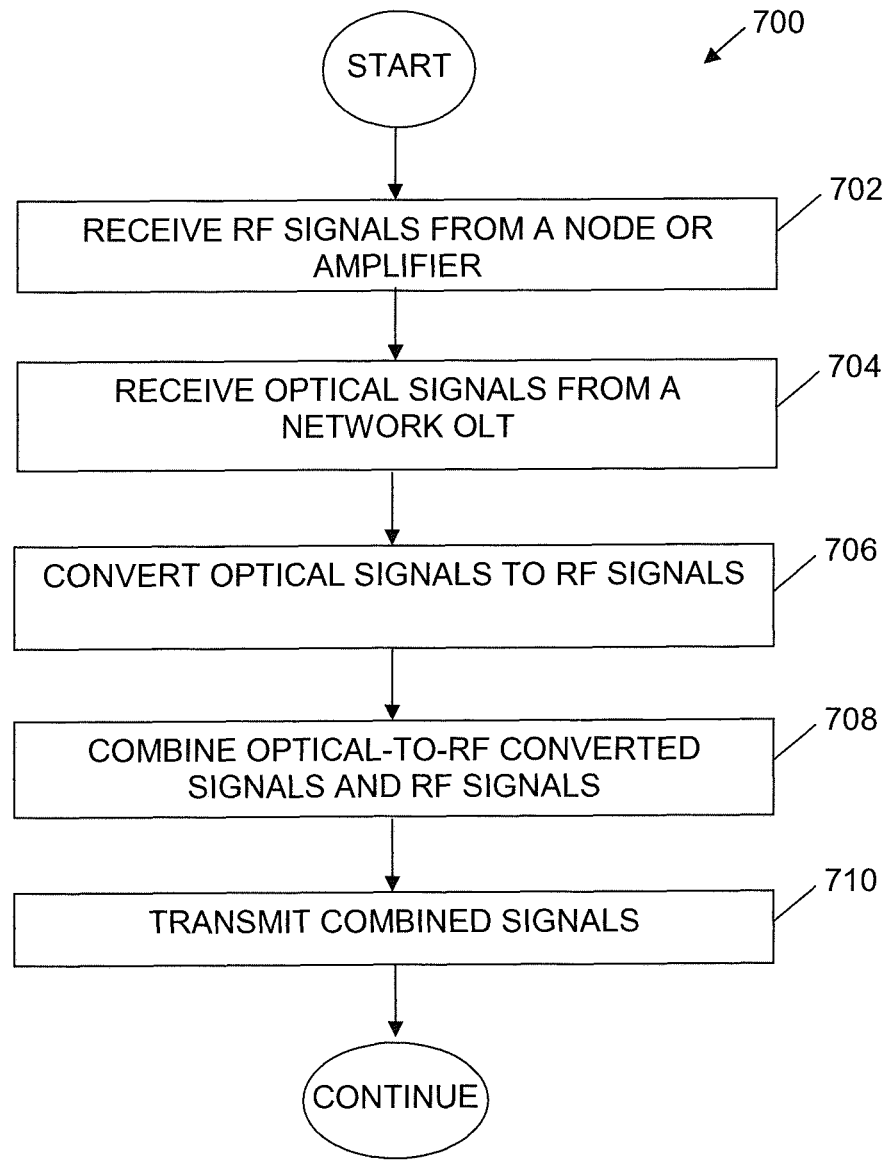
FIG. 7 is a logical flow diagram illustrating another embodiment of the method for providing content to a plurality of downstream devices according to the present invention.

In another embodiment, the method 700 of FIG. 7 may be utilized for providing content downstream within the network. As illustrated, at step 702 of the method 700, RF signals are received at an amplifier device. The RF signals are received from e.g., another amplifier device (upstream in a cascade), or from the local service node.

Next, per step 704, optical signals are received from a network OLT at the amplifier device. The provision of optical signals directly to the amplifier, as discussed previously, involves running an optical fiber to the amplifier where one previously was not provided. The optical signals are (at step 706) converted to RF signals using IFFT.

At step 708, the converted signals are combined with the previously received RF signals. The combined signals are then provided to other devices in the network (step 710). For instance, the converted signals may be provided to various user devices and/or to other amplifier devices downstream in a cascade.

Figure 9:
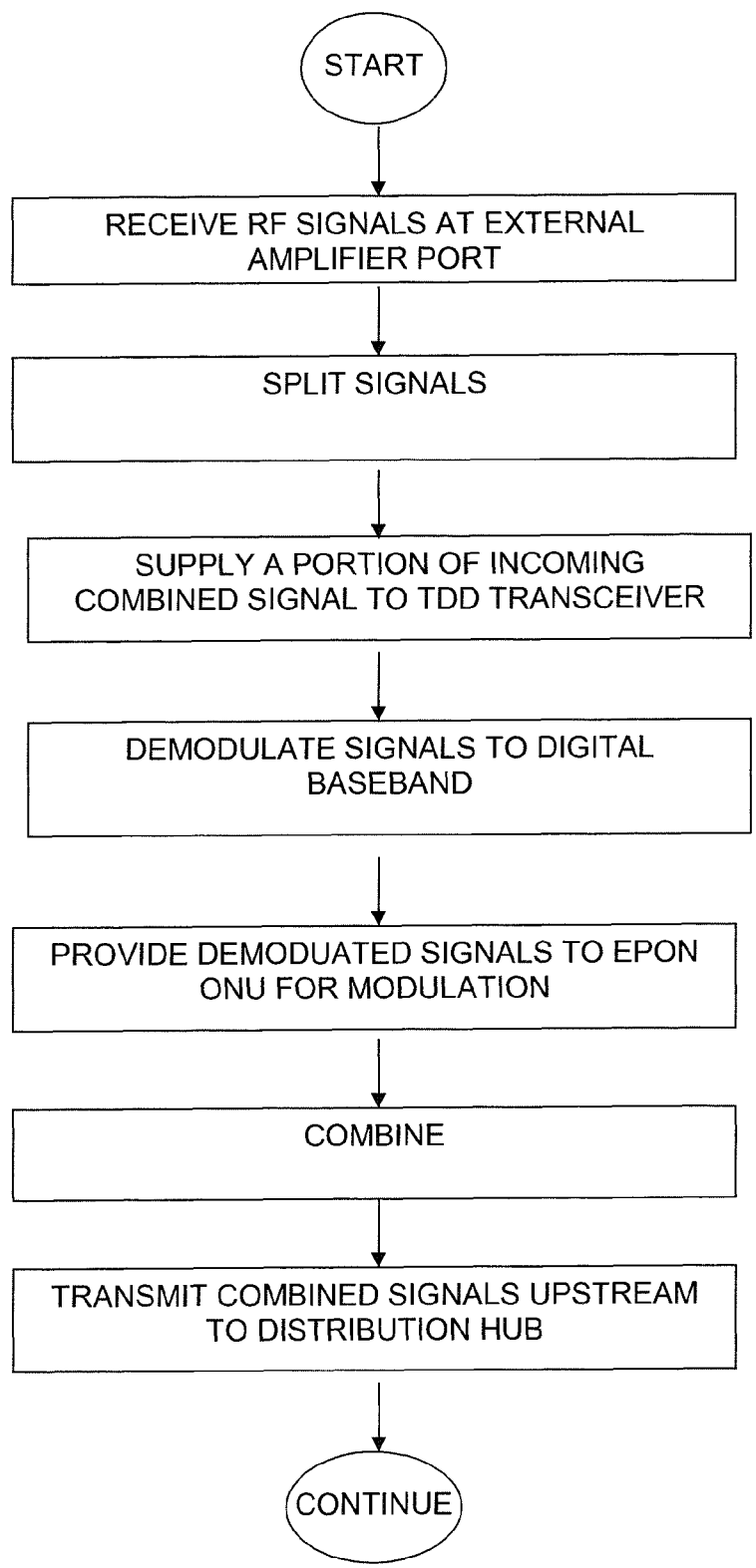
FIG. 9 is a logical flow diagram illustrating another embodiment of the method for providing signals upstream according to the present invention.

FIGS. 8 and 9 illustrate embodiments of methods adapted for the transmission of signals in an upstream direction according to various embodiments of the invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system configured to provide content to a plurality of client devices in a service group of a content delivery network, said system comprising:
    a network entity comprising at least one apparatus configured to transmit first optical signals; and
    a plurality of amplification and combination apparatus disposed substantially in series to one another and each configured to receive and convert said first optical signals to first radio frequency (RF) signals via a converter apparatus associated therewith, a first one in said series of said plurality of amplification and combination apparatus also being in communication with a service node, said service node configured to receive and transmit second RF signals to said first one in said series of said plurality of amplification and combination apparatus;
    wherein each of said plurality of client devices are in communication with at least one of said plurality of amplification and combination apparatus; and
    wherein said plurality of amplification and combination apparatus are each configured to combine said first RF signals with said second RF signals so as to generate a combined RF signal, and transmit said combined RF signal to at least a portion of said plurality of client devices.

2. The system of claim 1, wherein said second RF signals comprise legacy band signals.

3. The system of claim 1, wherein said service node comprises a distribution hub within a hybrid fiber coaxial network.

4. The system of claim 1, wherein said first optical signals are delivered to said plurality of amplification and combination apparatus via an optical fiber and an Ethernet passive optical network (EPON) optical line terminal (OLT).

5. The system of claim 1, wherein said plurality of amplification and combination apparatus are each further configured to combine said first RF signals at a first frequency band with said second RF signals at a second frequency band, said first frequency band being higher than and non-overlapping with said second frequency band.

6. The system of claim 1, wherein said plurality of amplification and combination apparatus are each further configured to transmit their respective combined RF signals via a time division scheme so as to substantially avoid interference therebetween.

7. A method for providing heterogeneous content to a plurality of devices in a network via a plurality of amplification and combination apparatus disposed in series to one another in an amplifier cascade, said method comprising:
    receiving first and second signals rendered in radio frequency (RF) and optical formats, respectively, at a first one of said plurality of amplification and combination apparatus;
    converting said second signals to said RF format at said first one of said plurality of amplification and combination apparatus;
    combining said first signals and said converted second signals into a common signal at said first one of said plurality of amplification and combination apparatus; and
    transmitting said common signal from said first one of said plurality of amplification and combination apparatus to at least said plurality of client devices in said network and/or a second one of said plurality of amplification and combination apparatus.

8. The method of claim 7, wherein said first and said second signals contain substantially different data.

9. The method of claim 7, wherein said act of combining comprises combining said first signals with a multi-carrier frequency rendering of said converted second signals.

10. The method of claim 9, wherein said multi-carrier frequency rendering of said converted second signals comprises an orthogonal frequency division multiplexing (OFDM) representation of said converted second signals.

11. A system configured to provide content to a plurality of client devices in a service group of a content delivery network, said system comprising:
    a network entity comprising at least one apparatus configured to transmit first optical signals; and
    an amplifier cascade comprising at least one amplifier apparatus, said at least one amplifier apparatus configured to receive first radio frequency (RF) signals from said network, receive optical signals from said network, amplify said received first RF signals, convert said optical signals to second RF signals, combine said first RF signals and said second RF signals into a combined RF signal, and transmit said combined RF signal to at least said plurality of client devices;
    wherein each of said plurality of client devices are configured to receive said transmitted combined RF signal.

12. The system of claim 11, wherein said amplifier cascade further comprises at least one combination apparatus in series with said at least one amplifier apparatus, said combination apparatus configured to combine said first RF signals and said second RF signals into said combined RF signal.

13. The system of claim 12, wherein said at least one amplifier apparatus and said combination apparatus are each further configured to transmit their respective combined signals via a time division scheme so as to substantially avoid interference therebetween.

14. The system of claim 11, wherein said at least one amplifier apparatus further comprises at least one filter configured to block higher band RF signals received from another amplifier apparatus upstream of said at least one amplifier apparatus within said amplifier cascade when said at least one amplifier apparatus amplifies said received first RF signal and/or combines said first RF signal and said second RF signal into said combined RF signal.

15. The system of claim 11, wherein prior to said transmission of said combined RF signal to said plurality of client devices, said at least one amplifier apparatus converts said combined RF signal into another signal.

16. An amplifier apparatus configured to provide content to a plurality of user devices in a network, said network comprising a cascade of a plurality of said amplifier apparatus arranged in series, said amplifier apparatus comprising:
  an amplifier block configured to:
    receive first radio frequency (RF) signals from said network; and
    amplify said received first RF signals;
  a converter configured to:
    receive optical signals from said network; and
    convert said optical signals into second RF signals; and
  a combiner apparatus configured to:
    combine said first and second RF signals into a combined RF signal; and
    transmit said combined RF signal to said plurality of user devices in said network in communication with said amplifier apparatus and to a downstream portion of said cascade of said plurality of said amplifier apparatus arranged in series.

17. The amplifier apparatus of claim 16, wherein said optical signals are received from an optical line terminal (OLT) located at a headend of said network.

18. The amplifier apparatus of claim 16, wherein said optical signals are received from an optical line terminal (OLT) located at a local network entity.

19. The amplifier apparatus of claim 16, wherein data contained in said first and said second RF signals is substantially similar.

20. The amplifier apparatus of claim 16, wherein said first apparatus further comprises at least one filter configured to block higher band RF signals received from another amplifier apparatus upstream of said amplifier apparatus within said amplifier cascade.

* * * * *